United States Patent
Woodall et al.

(10) Patent No.: US 12,228,072 B2
(45) Date of Patent: *Feb. 18, 2025

(54) SYSTEM AND METHOD HAVING MULTI-FLUID INJECTORS FOR ISOTHERMAL EXPANSION IN TURBINE STAGE OF GAS TURBINE ENGINE

(71) Applicant: GE Infrastructure Technology LLC, Greenville, SC (US)

(72) Inventors: John Farrior Woodall, Greer, SC (US); Joel Meador Hall, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,223

(22) Filed: Feb. 5, 2024

(65) Prior Publication Data

US 2024/0229710 A1    Jul. 11, 2024

Related U.S. Application Data

(63) Continuation of application No. 18/092,099, filed on Dec. 30, 2022, now Pat. No. 11,891,949.

(51) Int. Cl.
*F02C 6/00* (2006.01)
*F02C 3/34* (2006.01)
(Continued)

(52) U.S. Cl.
CPC ............... *F02C 6/003* (2013.01); *F02C 3/34* (2013.01); *F02C 6/18* (2013.01); *F02C 7/22* (2013.01); *F02C 9/26* (2013.01)

(58) Field of Classification Search
CPC .... F02C 6/003; F02C 6/18; F02C 3/34; F02C 7/22; F02C 9/26; F23R 3/34
See application file for complete search history.

(56) References Cited

U.S. PATENT DOCUMENTS 2,981,066 A    4/1961    Johnson
3,701,255 A    10/1972   Markowski
(Continued)

FOREIGN PATENT DOCUMENTS

CN    111622808 A    9/2020
EP    1847682 A1    10/2007
(Continued)

OTHER PUBLICATIONS

PCT International Search Report and Written Opinion; Application No. PCT/US2023/085337; dated Apr. 30, 2024; 9 pages.
(Continued)

*Primary Examiner* — William H Rodriguez
(74) *Attorney, Agent, or Firm* — Fletcher Yoder, P.C.

(57) ABSTRACT

A system includes a gas turbine having a turbine stage disposed in a combustion gas path, wherein the turbine stage includes turbine vanes disposed upstream from turbine blades. The system includes an isothermal expansion system coupled to the turbine stage. The isothermal expansion system includes multi-fluid injectors configured to vary axial positions of combustion within a turbine stage expansion of the turbine stage to reduce temperature variations over the turbine stage expansion, wherein at least one of the multi-fluid injectors is coupled to each of the turbine vanes. Each of the multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

20 Claims, 9 Drawing Sheets

(51) Int. Cl.
   *F02C 6/18* (2006.01)
   *F02C 7/22* (2006.01)
   *F02C 9/26* (2006.01)

(56) References Cited

U.S. PATENT DOCUMENTS

| | | | |
|---|---|---|---|
| 4,197,700 | A | 4/1980 | Jahnig |
| 4,822,249 | A | 4/1989 | Eckardt et al. |
| 4,984,432 | A | 1/1991 | Corey |
| 5,003,766 | A | 4/1991 | Paul |
| 5,557,922 | A | 9/1996 | Hoshino |
| 5,894,729 | A | 4/1999 | Proeschel |
| 5,987,876 | A | 11/1999 | Ziegner |
| 6,260,349 | B1 | 7/2001 | Griffiths |
| 6,378,287 | B2 | 4/2002 | Griffiths |
| 6,619,026 | B2 | 9/2003 | Carelli et al. |
| 6,840,049 | B2 | 1/2005 | Ziegner |
| 7,185,484 | B2 | 3/2007 | Griffin, III et al. |
| 7,603,863 | B2 | 10/2009 | Widener et al. |
| 7,784,261 | B2 | 8/2010 | Little |
| 8,047,001 | B2 | 11/2011 | Beeck et al. |
| 8,539,749 | B1 | 9/2013 | Wichmann et al. |
| 8,763,400 | B2 | 7/2014 | Bunker |
| 9,022,737 | B2 | 5/2015 | Piggush et al. |
| 9,046,262 | B2 | 6/2015 | Kim et al. |
| 9,080,451 | B2 | 7/2015 | Simpson et al. |
| 9,091,176 | B2 | 7/2015 | Martin et al. |
| 9,109,452 | B2 | 8/2015 | Martin et al. |
| 9,121,608 | B2 | 9/2015 | Elkady et al. |
| 9,458,767 | B2 | 10/2016 | Farrell |
| 9,708,977 | B2 | 7/2017 | Woodall et al. |
| 10,113,747 | B2 | 10/2018 | Crothers et al. |
| 10,443,394 | B2 | 10/2019 | Lee et al. |
| 10,465,520 | B2 | 11/2019 | Vandeputte |
| 10,895,161 | B2 | 1/2021 | Vogiatzis et al. |
| 11,891,949 | B1* | 2/2024 | Woodall ............... F02C 6/003 |
| 11,971,170 | B1* | 4/2024 | Hall ..................... F23R 3/20 |
| 2003/0221409 | A1 | 12/2003 | McGowan |
| 2004/0040309 | A1 | 3/2004 | Ziegner |
| 2006/0026962 | A1 | 2/2006 | Paul |
| 2006/0032210 | A1 | 2/2006 | Giffin, III et al. |
| 2007/0271898 | A1 | 11/2007 | Little |
| 2007/0277531 | A1 | 12/2007 | Widener et al. |
| 2008/0134685 | A1 | 6/2008 | Bunker et al. |
| 2009/0081048 | A1 | 3/2009 | Beeck et al. |
| 2012/0324896 | A1 | 12/2012 | Kim et al. |
| 2013/0032080 | A1 | 2/2013 | Lee et al. |
| 2013/0039777 | A1 | 2/2013 | Piggush et al. |
| 2013/0167545 | A1 | 7/2013 | Elkady et al. |
| 2013/0323079 | A1 | 12/2013 | Martin et al. |
| 2013/0340404 | A1 | 12/2013 | Hughes |
| 2014/0003960 | A1 | 1/2014 | Simpson et al. |
| 2014/0169977 | A1 | 6/2014 | Brettschneider et al. |
| 2014/0260263 | A1 | 9/2014 | Farrell |
| 2016/0052621 | A1 | 2/2016 | Ireland et al. |
| 2016/0108755 | A1 | 4/2016 | Carr et al. |
| 2016/0209040 | A1 | 7/2016 | Tamura et al. |
| 2016/0319703 | A1 | 11/2016 | Burg et al. |
| 2016/0333794 | A1 | 11/2016 | Baladi et al. |
| 2017/0176012 | A1 | 6/2017 | Lacy |
| 2018/0011955 | A1 | 1/2018 | Gintis |
| 2018/0023397 | A1 | 1/2018 | Vandeputte |
| 2018/0195396 | A1 | 7/2018 | Lee et al. |
| 2019/0301287 | A1 | 10/2019 | Iida et al. |
| 2020/0232330 | A1 | 7/2020 | Chuang et al. |
| 2021/0102472 | A1 | 4/2021 | Vogiatzis et al. |
| 2022/0220854 | A1 | 7/2022 | Patil et al. |
| 2022/0243596 | A1 | 8/2022 | Ray et al. |
| 2022/0243667 | A1 | 8/2022 | Rambo |

FOREIGN PATENT DOCUMENTS

| | | |
|---|---|---|
| EP | 2202385 A1 | 6/2010 |
| EP | 2933559 A1 | 10/2015 |
| GB | 750305 A | 6/1956 |
| JP | H02267301 A | 11/1990 |
| WO | 2018195622 A1 | 11/2018 |

OTHER PUBLICATIONS

Matthew Rice, "Simulation of Isothermal Combustion in Gas Turbines", Feb. 12, 2004 Thesis, Blacksburg, Virginia, 108 pgs.
Rolls Royce, The Jet Engine, 1996 (Year: 1996), 14 pgs.
Whitmore SA, et al., Armstrong IW (2020) Development of an Aerospike Nozzle for a High Performance Green Hybrid Propulsion (Hpghp) System for Small Satellites, Int J Astronaut Aeronautical Eng 5:033 (Year: 202), 1 pg.

* cited by examiner

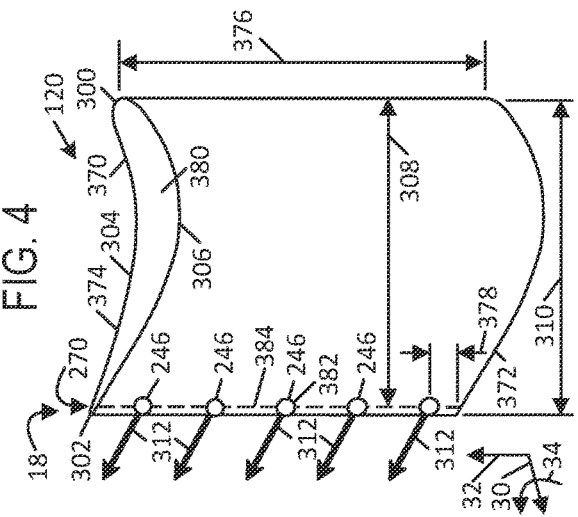
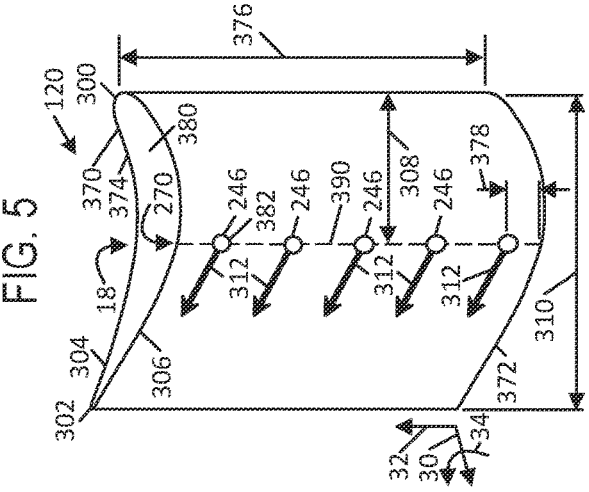
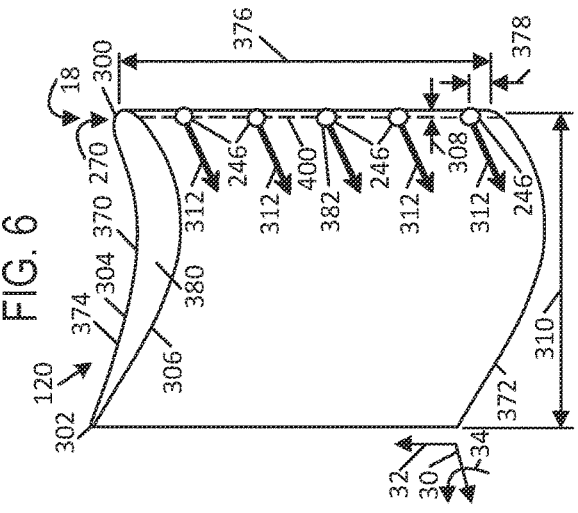
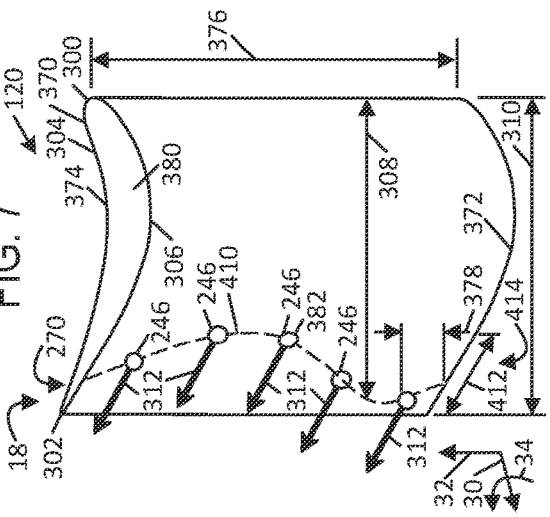
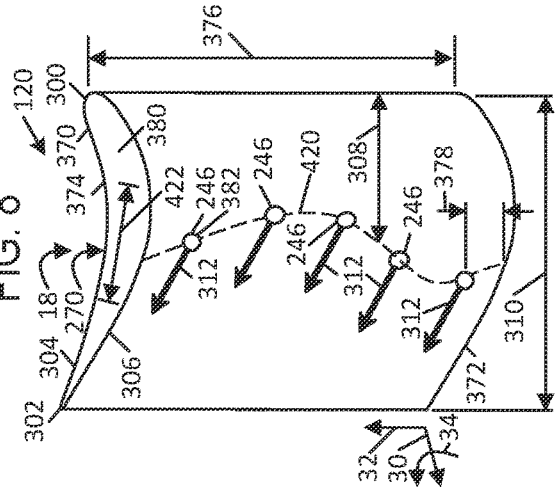
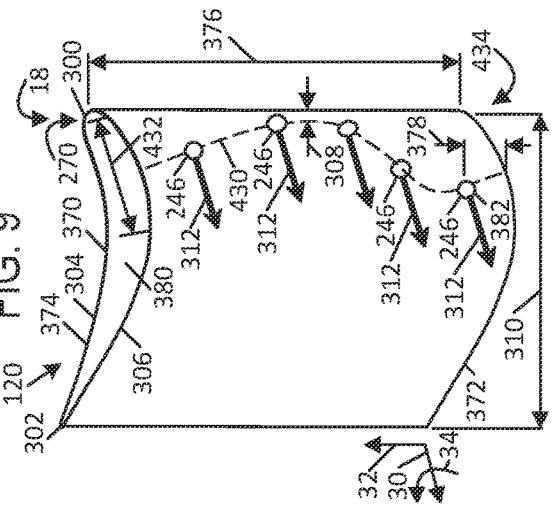

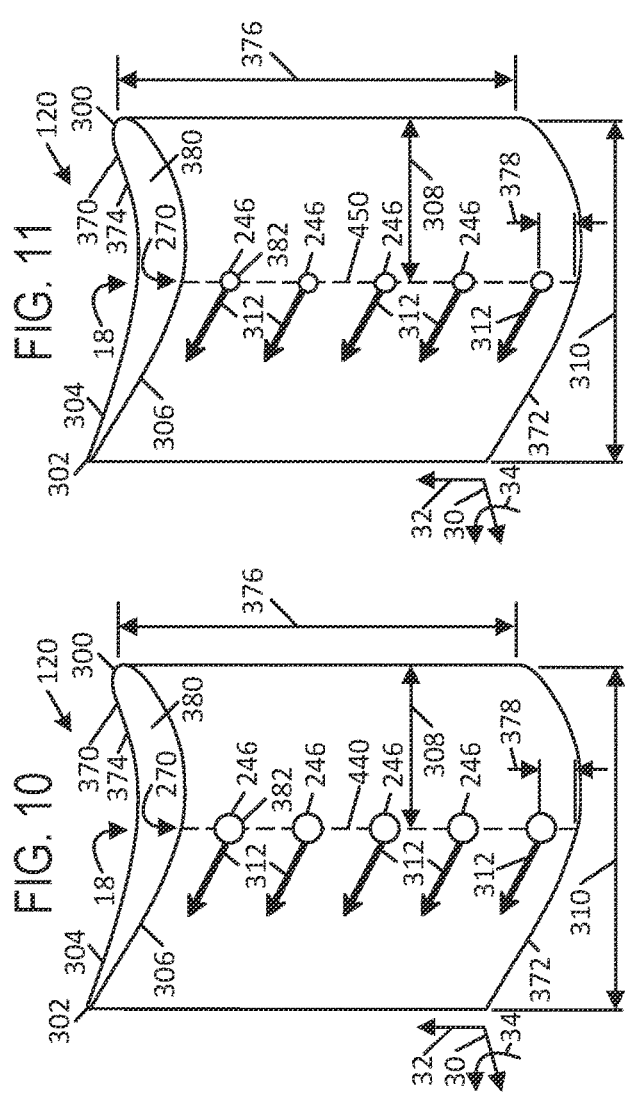
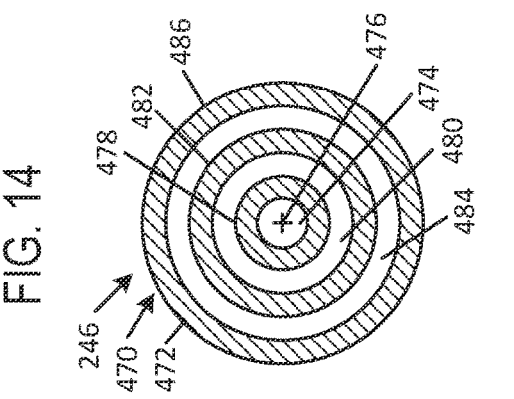
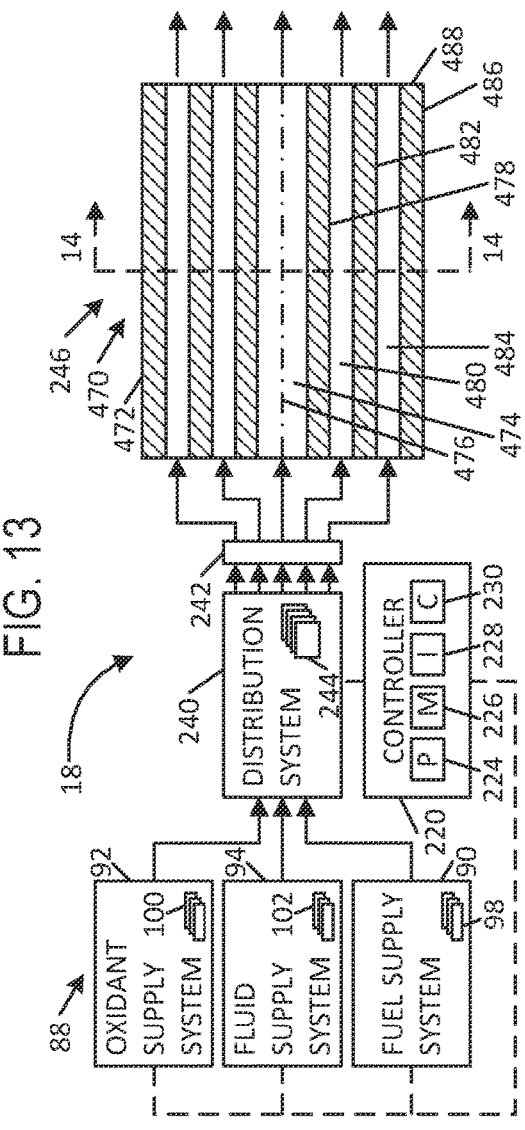

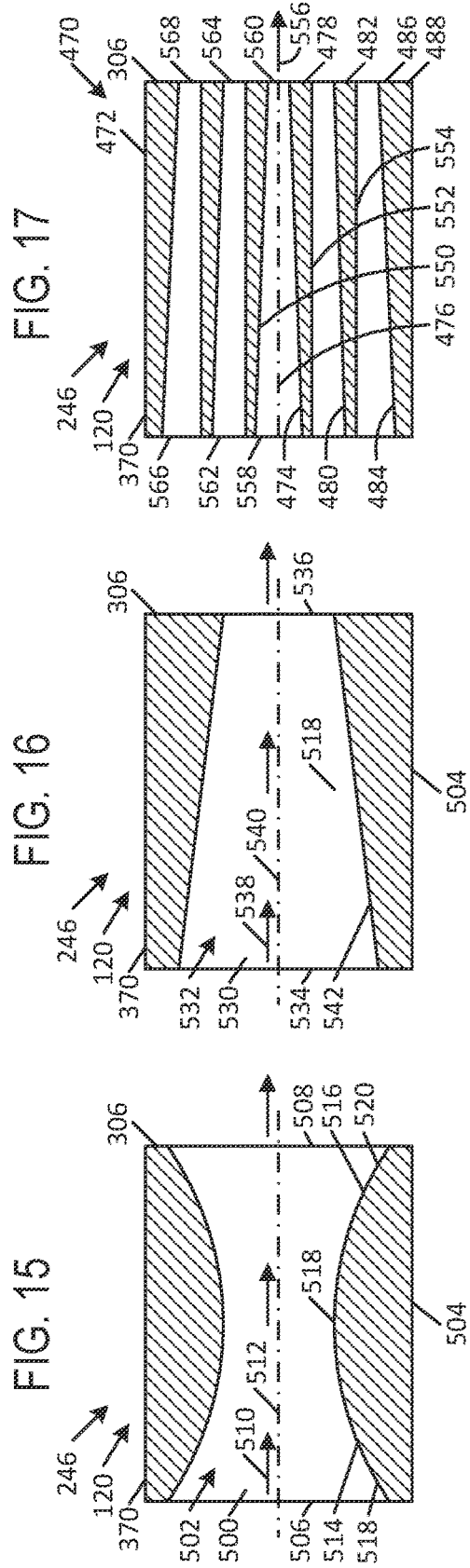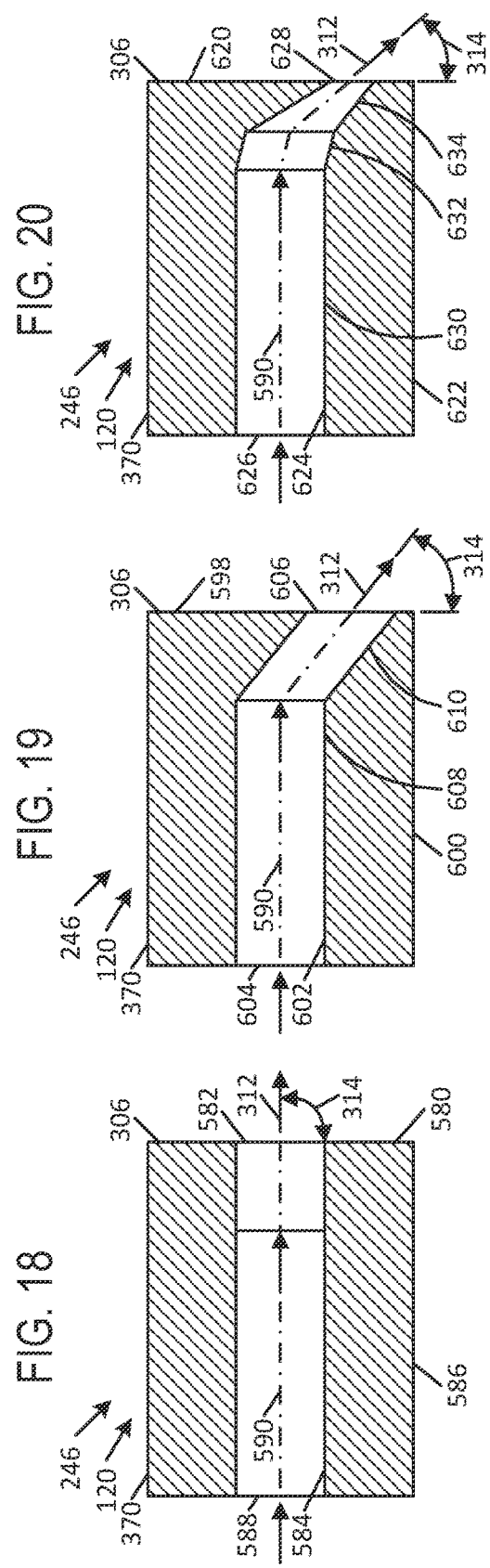

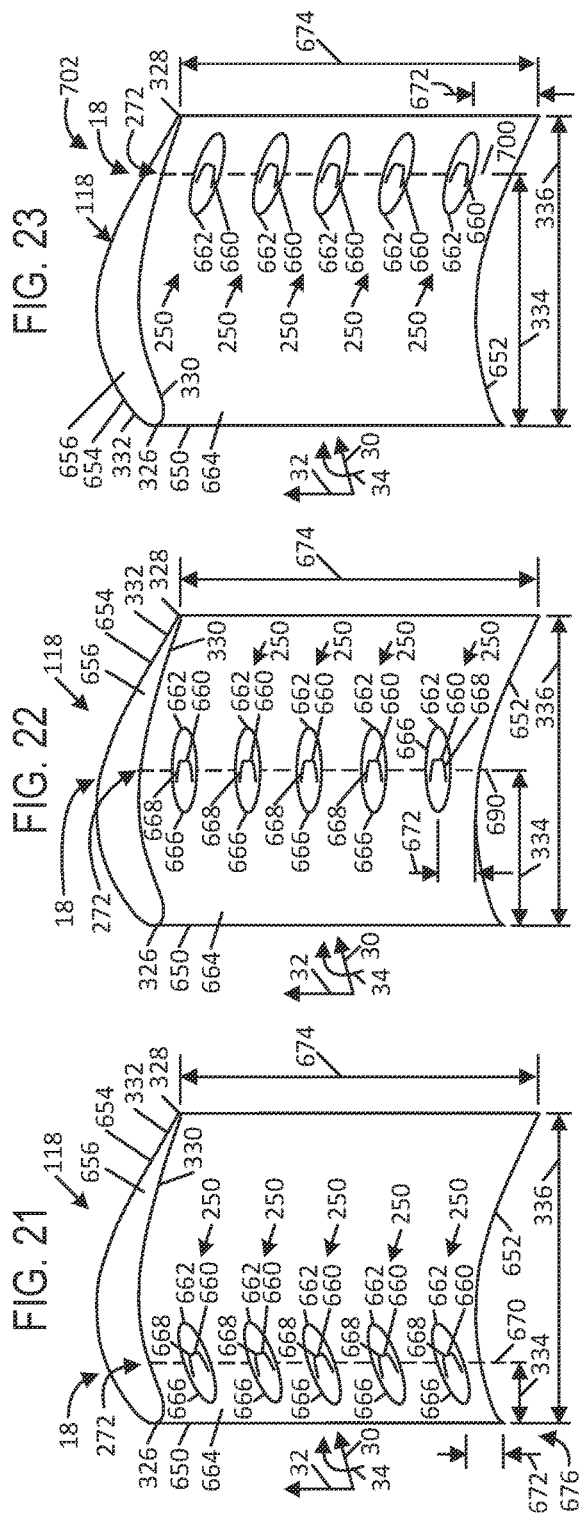
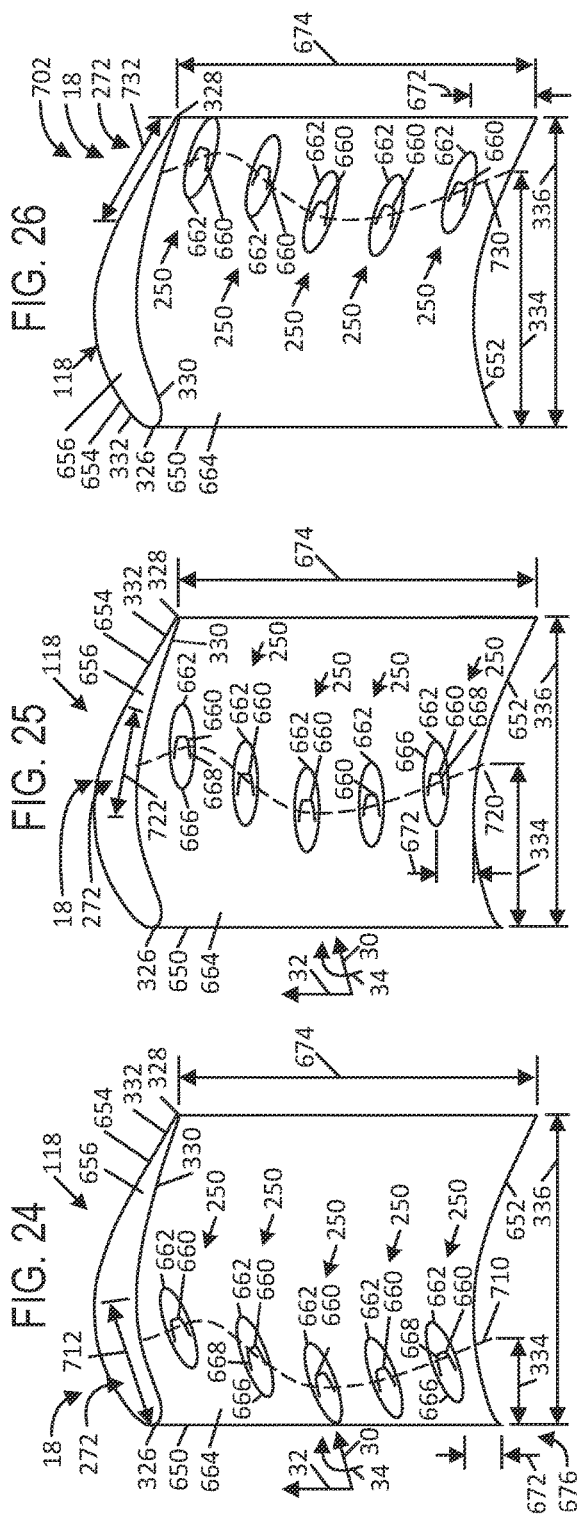

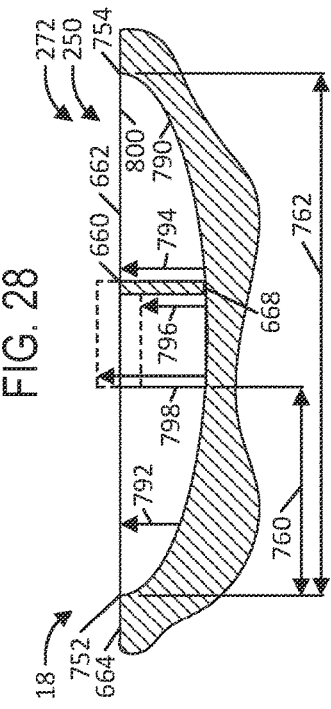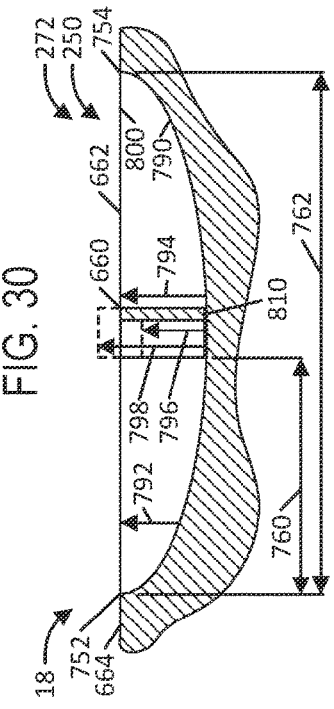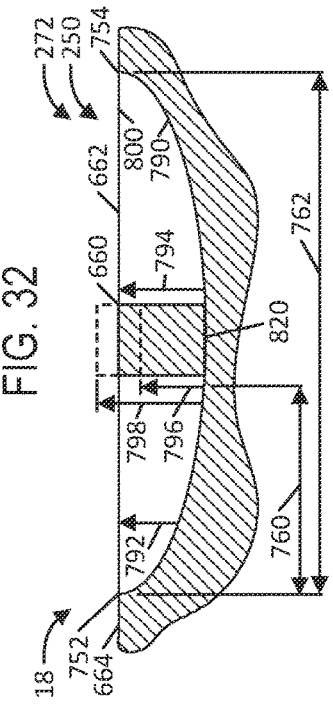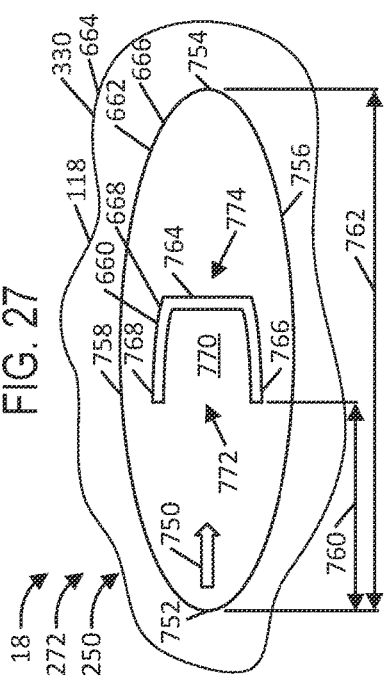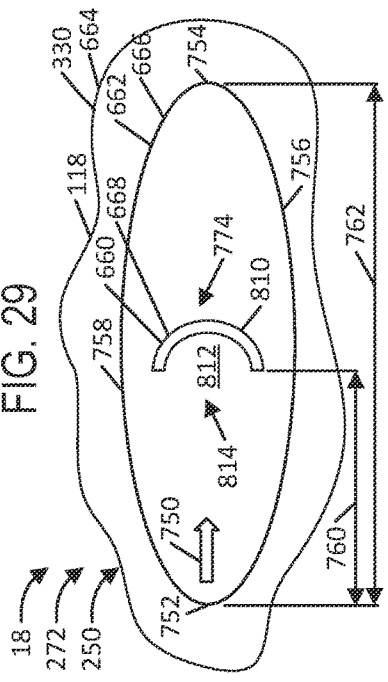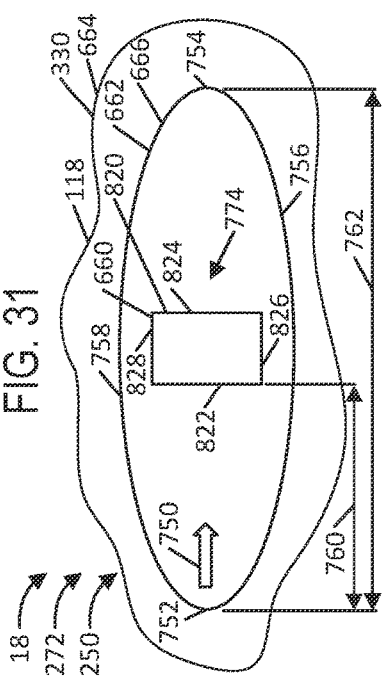

SYSTEM AND METHOD HAVING MULTI-FLUID INJECTORS FOR ISOTHERMAL EXPANSION IN TURBINE STAGE OF GAS TURBINE ENGINE

CROSS-REFERENCE TO RELATED APPLICATION

This application is a continuation of U.S. patent application Ser. No. 18/092,099, entitled "SYSTEM AND METHOD HAVING MULTI-FLUID INJECTORS FOR ISOTHERMAL EXPANSION IN TURBINE STAGE OF GAS TURBINE ENGINE," filed Dec. 30, 2022, which is herein incorporated by reference in its entirety for all purposes.

BACKGROUND

The subject matter disclosed herein relates to gas turbine engines and, more particularly, systems and methods for improving efficiency via an isothermal expansion in a turbine stage.

A gas turbine engine includes a compressor, a combustor, and a turbine driven by a combustion gas flow from the combustor. The turbine may include one or more turbine stages, each having a plurality of turbine blades. The combustion gas flow expands through the turbine and drives rotation of the turbine blades in each of the one or more turbine stages. Unfortunately, unlike a Carnot cycle, the combustion gas flow generally varies in temperature during expansion through each of the one or more turbine stages. Accordingly, a need exists for an isothermal expansion through each of the one or more stages.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

A system includes a gas turbine having a turbine shaft disposed along a rotational axis, a turbine casing disposed circumferentially about the turbine shaft, a combustion gas path disposed between the turbine shaft and the turbine casing, and a turbine stage disposed in the combustion gas path, wherein the turbine stage includes a plurality of turbine vanes disposed upstream from a plurality of turbine blades. The system includes an isothermal expansion system coupled to the turbine stage. The isothermal expansion system includes a plurality of multi-fluid injectors configured to vary axial positions of combustion within a turbine stage expansion of the turbine stage to reduce temperature variations over the turbine stage expansion, wherein at least one multi-fluid injector of the plurality of multi-fluid injectors is coupled to each of the plurality of turbine vanes. Each of the plurality of multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

A method includes routing a combustion gas through a turbine stage along a combustion gas path disposed between a turbine shaft and a turbine casing of a gas turbine, wherein the turbine shaft is disposed along a rotational axis, the turbine casing is disposed circumferentially about the turbine shaft, and the turbine stage includes a plurality of turbine vanes disposed upstream from a plurality of turbine blades. The method includes varying axial positions of combustion within a turbine stage expansion of the turbine stage to reduce temperature variations over the turbine stage expansion via a plurality of multi-fluid injectors of an isothermal expansion system coupled to the turbine stage. At least one multi-fluid injector of the plurality of multi-fluid injectors is coupled to each of the plurality of turbine vanes. Each of the plurality of multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

A system includes a controller having a processor, a memory, and instructions stored on the memory and executable by the processor to control combustion in a combustor to generate a combustion gas flow that flows through a turbine stage along a combustion gas path disposed between a turbine shaft and a turbine casing of a gas turbine, wherein the turbine shaft is disposed along a rotational axis, the turbine casing is disposed circumferentially about the turbine shaft, and the turbine stage includes a plurality of turbine vanes disposed upstream from a plurality of turbine blades. The controller is configured to control an isothermal expansion system including a plurality of multi-fluid injectors to vary axial positions of combustion within a turbine stage expansion of the turbine stage to reduce temperature variations over the turbine stage expansion, wherein at least one multi-fluid injector of the plurality of multi-fluid injectors is coupled to each of the plurality of turbine vanes. Each of the plurality of multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein:

FIG. 4 is a perspective view of an embodiment of a vane of the turbine section of FIGS. 1-3, further illustrating the fluid injectors at a constant axial distance from a leading edge of the vane in a trailing edge portion of the vane.

FIG. 5 is a perspective view of an embodiment of a vane of the turbine section of FIGS. 1-3, further illustrating the fluid injectors at a constant axial distance from the leading edge of the vane in an intermediate portion of the vane.

FIG. 6 is a perspective view of an embodiment of a vane of the turbine section of FIGS. 1-3, further illustrating the fluid injectors at a constant axial distance from the leading edge of the vane in a leading edge portion of the vane.

FIG. 7 is a perspective view of an embodiment of a vane of the turbine section of FIGS. 1-3, further illustrating the fluid injectors at a variable axial distance from the leading edge of the vane in the trailing edge portion of the vane.

FIG. 8 is a perspective view of an embodiment of a vane of the turbine section of FIGS. 1-3, further illustrating the fluid injectors at a variable axial distance from the leading edge of the vane in the intermediate portion of the vane.

FIG. 9 is a perspective view of an embodiment of a vane of the turbine section of FIGS. 1-3, further illustrating the fluid injectors at a variable axial distance from the leading edge of the vane in the leading edge portion of the vane.

FIGS. 10, 11, and 12 are perspective views of the vane of the turbine section of FIGS. 1-3, wherein the fluid injectors have different cross-sectional areas.

FIG. 13 is a schematic of an embodiment of the isothermal expansion system of FIGS. 1-12, further illustrating an embodiment of the fluid injector as a multi-fluid injector.

FIG. 14 is a cross-sectional view of the multi-fluid injector of FIG. 13 taken along line 14-14, further illustrating a geometry of fluid passages and walls of the multi-fluid injector.

FIG. 15 is a cross-sectional view of an embodiment of one of the fluid injectors of FIGS. 1-12, further illustrating a fluid passage having a converging-diverging passage geometry.

FIG. 16 is a cross-sectional view of an embodiment of one of the fluid injectors of FIGS. 1-12, further illustrating a fluid passage having a converging passage geometry.

FIG. 17 is cross-sectional view of the multi-fluid injector of FIGS. 13 and 14, further illustrating converging passage geometries of the fluid passages.

FIG. 18 is a cross-sectional view of an embodiment of the fluid injector of FIGS. 1-17, further illustrating an angle of a fluid injection axis or direction being approximately 90 degrees.

FIG. 19 is a cross-sectional view of an embodiment of the fluid injector of FIGS. 1-17, further illustrating the angle of the fluid injection axis or direction as an acute angle.

FIG. 20 is a cross-sectional view of an embodiment of the fluid injector of FIGS. 1-17, further illustrating the angle of the fluid injection axis or direction as an acute angle less than the acute angle of FIG. 19.

FIG. 21 is a perspective view of an embodiment of a blade of the turbine section of FIGS. 1-3, further illustrating the flame stabilizers at a constant axial distance from a leading edge of the blade in a leading edge portion of the blade.

FIG. 22 is a perspective view of an embodiment of a blade of the turbine section of FIGS. 1-3, further illustrating the flame stabilizers at a constant axial distance from the leading edge of the blade in an intermediate portion of the blade.

FIG. 23 is a perspective view of an embodiment of a blade of the turbine section of FIGS. 1-3, further illustrating the flame stabilizers at a constant axial distance from the leading edge of the blade in a trailing edge portion of the blade.

FIG. 24 is a perspective view of an embodiment of a blade of the turbine section of FIGS. 1-3, further illustrating the flame stabilizers at a variable axial distance from the leading edge of the blade in the leading edge portion of the blade.

FIG. 25 is a perspective view of an embodiment of a blade of the turbine section of FIGS. 1-3, further illustrating the flame stabilizers at a variable axial distance from the leading edge of the blade in the intermediate portion of the blade.

FIG. 26 is a perspective view of an embodiment of a blade of the turbine section of FIGS. 1-3, further illustrating the flame stabilizers at a variable axial distance from the leading edge of the blade in the trailing edge portion of the blade.

FIG. 27 is a top view of an embodiment of the flame stabilizer of FIGS. 1-3 and 21-26, further illustrating details of a protrusion disposed in a recess, wherein the protrusion has a curved or C-shaped geometry.

FIG. 28 is a cross-sectional view of an embodiment of the flame stabilizer of FIG. 27, further illustrating details of the protrusion and the recess, including a variable height of the protrusion.

FIG. 29 is a top view of an embodiment of the flame stabilizer of FIGS. 1-3 and 21-26, further illustrating details of a protrusion disposed in a recess, wherein the protrusion has a curved or arcuate wall.

FIG. 30 is a cross-sectional view of an embodiment of the flame stabilizer of FIG. 29, further illustrating details of the protrusion and the recess, including a variable height of the protrusion.

FIG. 31 is a top view of an embodiment of the flame stabilizer of FIGS. 1-3 and 21-26, further illustrating details of a protrusion disposed in a recess, wherein the protrusion has a rectangular geometry.

FIG. 32 is a cross-sectional view of an embodiment of the flame stabilizer of FIG. 31, further illustrating details of the protrusion and the recess, including a variable height of the protrusion.

DETAILED DESCRIPTION

Figure 1:
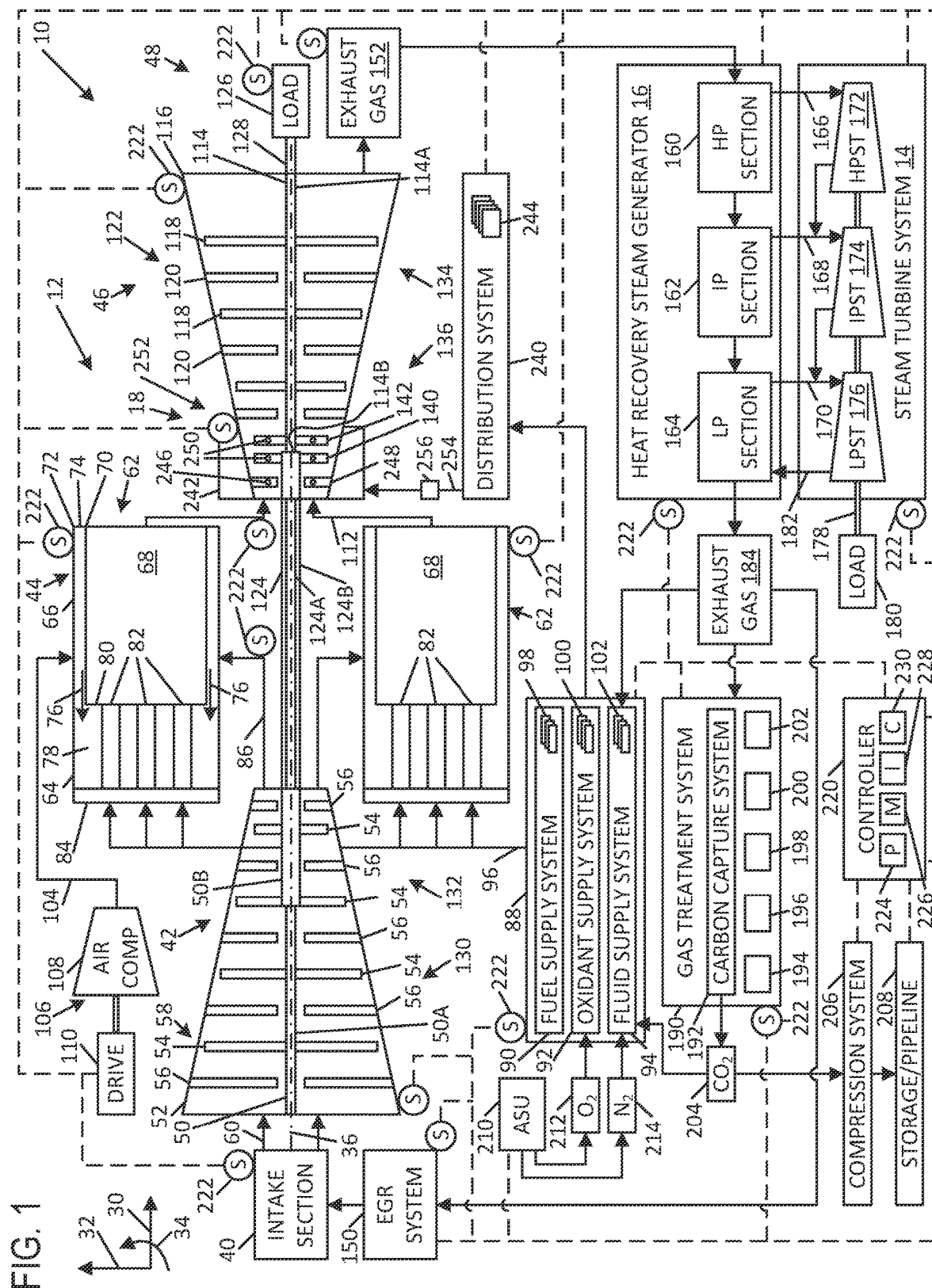
FIG. 1 is a block diagram of an embodiment of a combined cycle system having a gas turbine system, a steam turbine system, and a heat recovery steam generator (HRSG), and an isothermal expansion system in a turbine stage.

One or more specific embodiments of the presently disclosed systems and methods are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The disclosed embodiments are configured to provide isothermal expansion (e.g., expansion with constant temperature) in a turbine stage of a gas turbine system by controlling (e.g., varying and/or distributing) the heat release of combustion across rotary blades in a turbine stage expansion of the turbine stage. The isothermal expansion is intended to expand the combustion gas with a constant temperature, although the disclosed embodiments also may allow some temperature variation with a substantially isothermal expansion. The heat release of combustion is controlled at least by a variable injection system having fluid injectors in stationary vanes upstream from the rotary blades, a variable stabilizer system having flame stabilizers on the rotary blades, or a combination thereof. The fluid injectors and flame stabilizers are configured to distribute the heat release of combustion (e.g., via axial positioning of flames) along the rotary blades over an axial range between leading and trailing edges of the rotary blades within the turbine stage expansion, wherein the axial range may vary between an entire axial distance and a partial axial distance between the leading and trailing edges. The fluid injectors may be fuel injectors or may be multi-fluid injectors that deliver fuel, oxidant, and another fluid as a barrier gas.

The variable injection system may passively control and/or actively control the axial positions of heat release of combustion across the rotary blades within the turbine stage expansion via the fluid injectors on the stationary vanes. For example, the variable injection system may passively control the axial positions of heat release of combustion across the rotary blades within the turbine stage expansion via the fluid injectors on the stationary vanes by employing different mounting positions of the fluid injectors (e.g., axial and radial positions), different geometries of fluid ports, different cross-sectional areas of the fluid ports, different angles of fluid injection, or other characteristics that are not controlled during operation.

By further example, the variable injection system may actively control the axial positions of heat release of combustion across the rotary blades within the turbine stage expansion via the fluid injectors on the stationary vanes by employing control of the fluid flow (e.g., fuel flow, oxidant flow, and/or barrier fluid flow) through the fluid injectors. The variable injection system may include a plurality of fluid circuits (e.g., fuel circuits, oxidant circuits, and/or barrier fluid circuits) independently coupled to a plurality of different fluid injectors on the same or different stationary vanes. Accordingly, the variable injection system may change the fluid pressures, flow rates, or other fluid characteristics to vary the downstream axial distances until the fuel mixes and combusts along the rotary blades. In certain embodiments, the variable injection system may combine active and passive control to vary the downstream axial distances until the fuel mixes and combusts along the rotary blades within the turbine stage expansion.

The variable injection system also may be actively controlled, for example, using the plurality of fluid circuits and flow control valves, to adjust the axial positioning of the heat release of combustion within the turbine stage expansion in response to operating conditions of the gas turbine system (e.g., full load versus part load conditions). The variable injection system may selectively move the axial positions of heat release of combustion further upstream from trailing edges of the rotary blades in response to decreases in the load and/or move the axial positions of heat release of combustion further downstream toward the trailing edges of the rotary blades via control of fluid flows through the fluid injectors. For example, the variable injection system may selectively vary fluid flows through different fluid circuits (e.g., fuel circuit) coupled to different fluid injectors at different axial positions along stationary vanes.

With decreases in the load, the variable injection system may selectively decrease or stop fluid flows (e.g., fuel flows) through fluid circuits to the fluid injectors at downstream positions along the stationary vanes, while maintaining the fluid flows (e.g., fuel flows) through the fluid circuits to the fluid injectors at upstream positions along the stationary vanes. With increases in the load, the variable injection system may selectively increase or start the fluid flows (e.g., fuel flows) through the fluid circuits to the fluid injectors at downstream positions along the stationary vanes, while maintaining the fluid flows (e.g., fuel flows) through the fluid circuits to the fluid injectors at the upstream positions along the stationary vanes. The ability to vary the axial positions of heat release of combustion along the rotary blades within the turbine stage expansion thus enables isothermal expansion in the turbine stage in various operating conditions of the gas turbine system, including both full load and part load conditions.

The variable stabilizer system having flame stabilizers on the rotary blades may passively control the axial positions of heat release of combustion across the rotary blades within the turbine stage expansion via differences in the flame stabilizers, such as different mounting positions (e.g., axial and radial positions), different geometries, different cross-sectional areas, and/or different dimensions, from one flame stabilizer to another and/or from one rotary blade to another in the turbine stage. For example, the flame stabilizers may be mounted to a plurality of rotary blades in axial positions that vary in a plurality of incremental axial steps from the leading edge to the trailing edge. The flame stabilizers may be fixed or stationary relative to the rotary blades.

The following discussion generally presents various embodiments of an isothermal expansion system for the turbine stage to help improve efficiency of the gas turbine system. The isothermal expansion system may include any and all combinations of the disclosed features, including variations in the variable injection system and the variable stabilizer system. Although reference is made to an isothermal expansion system, the disclosed embodiments are intended to include substantially isothermal expansion through the turbine stage within the turbine stage expansion.

FIG. 1 is a block diagram of an embodiment of a combined cycle system 10 having a gas turbine system 12, a steam turbine system 14, and a heat recovery steam generator (HRSG) 16. As discussed in further detail below, the combined cycle system 10 includes an isothermal expansion system 18 coupled to the gas turbine system 12 to facilitate isothermal expansion within the turbine stage. Before discussing details of the isothermal expansion system 18, various aspects of the combined cycle system 10 are discussed in further detail. For purposes of orientation in the drawings, reference may be made to an axial direction or axis 30, a radial direction or axis 32 extending radially away from the axial direction or axis 30, and a circumferential direction or axis 34 extending circumferentially around the axial direction or axis 30. The directions or axes 30, 32, and 34 may be in reference to a rotational axis 36 of the gas turbine system 12, for example.

The gas turbine system 12 may include an intake section 40, a compressor or compressor section 42, a combustor section 44, a gas turbine or turbine section 46, and an exhaust section 48. The compressor section 42 may include at least one shaft 50 disposed along the rotational axis 36, a casing 52 (e.g., annular casing) disposed circumferentially about the at least one shaft 50, a plurality of rotating compressor blades 54 extending radially outward from the at least one shaft 50, and a plurality of stationary compressor vanes 56 extending radially inward from the casing 52 toward the at least one shaft 50. In the illustrated embodiment, the compressor section 42 may include a plurality of compressor stages 58, each having a plurality of the compressor vanes 56 spaced circumferentially about the at least one shaft 50 at an axial position, and a plurality of the compressor blades 54 spaced circumferentially about the at least one shaft 50 at a different axial position (i.e., the compressor vanes 56 and the compressor blades 58 are axially spaced apart). Accordingly, the compressor section 42 is configured to intake a gas flow from the intake section 40 and to progressively compress the gas flow through the plurality of compressor stages 58. As discussed in further detail below, the gas flow may include an intake air flow, an exhaust gas recirculation (EGR) flow, or a combination thereof.

The combustor section 44 may include one or more combustors 62, such as a single annular combustor disposed circumferentially about the rotational axis 36 or a plurality of combustors 62 circumferentially spaced about the rotational axis 36. In the illustrated embodiment, each combustor 62 includes a head end portion 64 coupled to a combustion portion 66. The combustion portion 66 includes a combustion chamber 68, a combustor liner 70 disposed circumferentially about the combustion chamber 68, a flow sleeve 72 disposed circumferentially about the combustor liner 70, and a passage 74 extending between the combustor liner 70 and the flow sleeve 72. The passage 74 is configured to route a compressed gas flow in an upstream direction 76 toward a head end chamber 78 disposed in the head end portion 64. The head end chamber 78 and the combustion chamber 68 of the combustor 62 are separated or divided from one another by an intermediate plate 80. In the head end chamber 78, a plurality of fuel nozzles 82 are coupled to the intermediate plate 80 and an end plate 84 of the head end portion 64. In operation, each combustor 62 receives a compressed gas 86 (e.g., air, EGR, etc.) from the compressor section 42, routes the compressed gas 86 along the passage 74 toward the head end chamber 78 as indicated by arrow 76, and routes the compressed gas through the fuel nozzles 82 into the combustion chamber 68.

In certain embodiments, each combustor 62 may receive one or more fluid flows from a fluid system 88, which may include a fuel supply system 90, an oxidant supply system 92, and a fluid supply system 94. The fluid systems 88 may include one or more fluid circuits 96 (e.g., fluid conduits, manifolds, valves, etc.) extending to the plurality of fuel nozzles 82 and/or other locations along the combustor 62. For example, the fuel supply system 90 is configured to supply one or more fuels, such as liquid and/or gas fuels, into each of the fuel nozzles 82 for injection into the combustion chamber 68. The fuels may include natural gas, syngas generated from a gasifier, methane, hydrogen, biofuel, fuel oils, or any combination thereof. The oxidant supply system 92 is configured to supply one or more oxidants, such as air, oxygen, oxygen-rich air, or oxygen-lean air, into each of the fuel nozzles 82 for injection into the combustion chamber 68. The fluid supply system 94 is configured to inject one or more fluids, such as exhaust gas, carbon dioxide, an inert gas such as nitrogen, or any combination thereof, into the fuel nozzles 82 for injection into the combustion chamber 68. In certain embodiments, the fluid system 88 may exclude the oxidant supply system 92 and/or the fluid supply system 94.

The fluid system 88 may include a plurality of components to control flows of the various fluids to the combustor 62. For example, the fuel supply system 90 may include one or more components 98, the oxidant supply system 92 may include one or more components 100, and the fluid supply system 94 may include one or more components 102. In certain embodiments, the components 98, 100, and 102 may include one or more valves, pressure regulators, flow regulators, filters, water removal units, particulate removal units, manifolds, flow controllers, or any combination thereof.

The fuel nozzles 82 are configured to inject one or more fuels from the fuel supply system 90, the oxidant from the oxidant supply system 92, the fluid from the fluid supply system 94, the compressed gas 86 from the compressor section 42. In certain embodiments, the fuel nozzles 82 are configured to inject a compressed air 104 from a compressor system 106 having an air compressor 108 coupled to a drive 110, such as an electric motor, a combustion engine, a shaft coupled to the gas turbine system 12, or another suitable drive. For example, in certain embodiments of the gas turbine system 12 having exhaust gas recirculation (EGR), the compressor section 42 supplies the compressed gas 86 (e.g., compressed exhaust gas) to each combustor 62, while the compressor system 106 supplies the compressed air 104 to each combustor 62 and/or the oxidant supply system 92 supplies the oxidant to each combustor 62.

By further example, in certain embodiments of the gas turbine system 12 without exhaust gas recirculation (EGR), the compressor section 42 supplies the compressed gas 86 (e.g., compressed air) to each combustor 62 without any need for additional air and/or oxidant supplies. Thus, the compressor system 106 may optionally supply the compressed air 104 to each combustor 62 and/or the oxidant supply system 92 may optionally supply the oxidant to each combustor 62. In operation, the fuel may be combusted with the air and/or the oxidant in the combustion chamber 68 of each combustor 62, thereby generating a hot combustion gas 112 for delivery from the combustion chamber 68 into the turbine section 46.

The turbine section 46 includes at least one shaft 114 disposed along the rotational axis 36, a casing 116 (e.g., annular casing) disposed circumferentially about the at least one shaft 114, a plurality of rotating turbine blades 118 extending radially outward from the at least one shaft 114, and a plurality of stationary turbine vanes 120 extending radially inward from the casing 116 toward the at least one shaft 114. The turbine section 46 may include a plurality of turbine stages 122, each having a plurality of the turbine vanes 120 spaced circumferentially about the at least one shaft 114 at an axial position, and a plurality of the turbine blades 118 spaced circumferentially about the at least one shaft 114 at a different axial position (i.e., the turbine vanes 120 and the turbine blades 118 are axially spaced apart). The at least one shaft 114 also may be coupled to the at least one shaft 50 of the compressor section 42 via at least one intermediate shaft 124. Additionally, the at least one shaft 114 may be coupled to a load 126 via a shaft 128. In certain embodiments, the load 126 may include an electrical generator, a machine, a propulsion system for a vehicle, or any other suitable load. In the illustrated embodiment, the load 126 may be an electrical generator, such that the combined cycle system 10 is a combined cycle power plant. In operation, the combustion gas 112 flows from the combustor 62 into the turbine section 46, wherein the combustion gas 112 progressively expands and drives rotation of the turbine blades 118 coupled to the at least one shaft 114 in each of the turbine stages 122. Thus, the combustion gas 112 drives the turbine section 46, which in turn drives the compressor section 42 and the load 126 via the interconnected shafts 50, 124, 114, and 128.

In certain embodiments, the gas turbine system 12 may be configured with a common rotational direction of the shafts 50, 114, 124, and 128 and the connected compressor blades 54 and turbine blades 118. The shafts 50, 114, 124, and 128 may be removably coupled together with shaft connections, such as flanged joints. In some embodiments, some of the shafts may be combined to reduce the number of shafts. For example, all of the illustrated shafts 50, 114 and 124 may represent a common shaft rotating in the common rotational direction, such as a clockwise or counter-clockwise rotational direction.

Alternatively, in some embodiments, the gas turbine system 12 may be configured for counter-rotation of the compressor blades 54 in the compressor section 42 and/or counter-rotation of the turbine blades 118 in the turbine section 46. In such embodiments, the at least one shaft 50 of the compressor section 42 may include a concentric arrangement of an inner shaft 50A surrounded by an outer shaft 50B along at least a portion of the compressor section 42. Similarly, the at least one shaft 114 of the turbine section 46 may include a concentric arrangement of an inner shaft 114A surrounded by an outer shaft 114B along at least a portion of the turbine section 46. For example, in the compressor section 42, the inner shaft 50A may be coupled to the compressor blades 54 in a subset 130 of the compressor stages 58 while the outer shaft 50B is coupled to a subset 132 of the compressor stages 58. Similarly, in the turbine section 46, the inner shaft 114A may be coupled to the turbine blades 118 in a subset 134 of the turbine stages 122, while the outer shaft 114B may be coupled to the turbine blades 118 in a subset 136 of the turbine stages 122. For example, the counter-rotating blades in the turbine section 46 may include a turbine blade set 140 (or turbine stage portion) followed by a turbine blade set 142 (or turbine stage portion), wherein the turbine blade sets 140 and 142 are coupled to the respective outer shaft 114B and the inner shaft 114A, respectively.

The outer shaft 114B of the turbine section 46 is coupled to the outer shaft 50B of the compressor section 42 via an outer shaft 124B of the intermediate shaft 124. Similarly, the inner shaft 114A of the turbine section 46 is coupled to the inner shaft 50A of the compressor section 42 via an inner shaft 124A of the intermediate shaft 124. In operation, the inner shaft 50A and associated compressor blades 54, the inner shaft 124A, and the inner shaft 114A and associated turbine blades 118 (i.e., turbine blade set 142) rotate in a first direction about the rotational axis 36. The outer shaft 50B and associated compressor blades 54, the outer shaft 124B, and the outer shaft 114B and associated turbine blades 118 (i.e., turbine blade set 140) rotate in a second rotational direction about the rotational axis 36. The first and second rotational directions are counter or opposite from one another. Although the gas turbine system 12 may be configured with the counter-rotating compressor and turbine blades 54 and 118, embodiments of the gas turbine system 12 may include a single rotational direction of the shafts and associated blades. In embodiments with a single rotational direction of the shafts, turbine blade set 140 may be the only blade set used for the first turbine stage, and turbine blade set 142 may be omitted from the first turbine stage. Counter-rotating blade sets 140, 142 are useful in turbines where the pressure drop across the first turbine stage is sufficiently high as to cause too much loading for a single set of turbine blades. Accordingly, the use of two blade sets, which are configured to counter rotate relative to one another, manages the pressure drop.

The gas turbine system 12 can be configured with or without the compressor system 106 and an exhaust gas recirculation (EGR) system 150. The EGR system 150 is configured to recirculate an exhaust gas 152 output by the turbine section 46 back into the compressor section 42 (e.g., via intake section 40) for compression and delivery to the combustor section 44. However, the gas turbine system 12 may exclude the EGR system 150 and intake only an airflow into the intake section 40 for compression by the compressor section 42.

In certain embodiments of the gas turbine system 12 having the EGR system 150, the recirculated exhaust gas 152 flows through the intake section 40 and each of the compressor stages 58 of the compressor section 42, thereby compressing the recirculated exhaust gas as the compressed gas 86 for delivery into combustor section 44. Additionally, the combustor section 44 may receive compressed air 104 from the air compressor 108 of the compressor system 106, an oxidant from the oxidant supply system 92, or a combination thereof, through the fuel nozzles 82. The combustor section 44 also receives the fuel from the fuel supply system 90, such as through the fuel nozzles 82. The fuel from the fuel supply system 90 then combusts with the air from the compressor system 106 and/or the oxidant from the oxidant supply system 92 to generate the combustion gases 112, which then flow through the turbine section 46 to drive rotation of the turbine blades 118 in each of the turbine stages 122. The recirculated exhaust gas helps to reduce the temperature and formation of certain emissions (e.g., nitrogen oxides ($NO_X$)) associated with combustion in the combustor section 44.

In certain embodiments of the gas turbine system 12 without the EGR system 150, the compressor section 42 receives an airflow from the intake section 40, progressively compresses the airflow via the compressor stages 58, and delivers the compressed airflow as the compressed gas 86 into the combustor section 44. The compressed airflow then facilitates combustion of the fuel from the fuel supply system 90, thereby generating the hot combustion gases 112 for delivery to the turbine section 46. In such embodiments, the compressor system 106 may be excluded or included to provide additional compressed air 104 to the combustor section 44. Additionally, the oxidant supply system 92 may be excluded or included to provide additional oxidant flow to the combustor section 44. Regardless of the configuration, the combustion gas 112 drives rotation of the turbine blades 118 in the turbine stages 122, thereby rotating the at least one shaft 114 coupled to the at least one shaft 50 of the compressor section 42 and the shaft 128 driving the load 126.

The exhaust gas 152 output by the turbine section 46 may then pass through the HRSG 16 for transfer of heat from the exhaust gas into water to generate steam for the steam turbine system 14. For example, the HRSG 16 may include a high-pressure section 160, an intermediate-pressure section 162, and a low-pressure section 164 in a series arrangement, thereby generating a high-pressure steam 166, an intermediate-pressure steam 168 and a low-pressure steam 170. The heat recovery steam generator 16 may route the high-pressure steam 166 to a high-pressure steam turbine 172, the intermediate-pressure steam 168 to an intermediate-pressure steam turbine 174, and the low-pressure steam 170 to a low-pressure steam turbine 176 of the steam turbine system 14. The steam drives rotation of blades within each of the steam turbines 172, 174, 176, thereby driving a shaft 178 coupled to a load 180, such as an electric generator. The low-pressure steam turbine 176 also may return a condensate 182 back to the low-pressure section 164 of the HRSG 16. The HRSG 16 may then output the exhaust gas 152 as a partially cooled exhaust gas 184, which may then pass through a gas treatment system 190.

A gas treatment system 190 may include a carbon capture system 192 and a plurality of gas treatment components, such as components 194, 196, 198, 200, and 202. The gas treatment system 190 is configured to remove one or more undesirable substances from the exhaust gas 184. In certain embodiments, the carbon capture system 192 is configured to remove and capture carbon oxides ($CO_X$), such as carbon dioxide ($CO_2$) and/or carbon monoxide (CO). The components 194, 196, 198, 200, and 202 may be part of and/or separate from the carbon capture system 192. The components 194, 196, 198, 200, and 202 may include one or more of a gas removal system, a water removal system (e.g., water gas separator), a particulate removal system (e.g., filter and/or solid gas separator), one or more heat exchangers, or any combination thereof. The separators may include gravity separators, centrifugal separators, or a combination thereof. The gas removal system may be part of the carbon capture system 192 and include a solvent-based gas absorption system, a sorbent-based gas adsorption system, or a combination thereof. The gas removal system may include an acid gas removal (AGR) system, a sulfur recovery unit, or a combination thereof. In the illustrated embodiment, the carbon capture system 192 may capture and output carbon dioxide ($CO_2$) 204, which may further be directed to the fluid supply system 94 and/or a compression system 206. For example, the compression system 206 may include one or more compressors configured to compress the carbon dioxide and deliver the carbon dioxide to storage and/or a pipeline 208.

In certain embodiments, the exhaust gas 184 may partially or entirely bypass the gas treatment system 190 and flow to the EGR system 150, and/or the exhaust gas 184 may partially or entirely flow through the gas treatment system 190 before flowing to the EGR system 150. The EGR system 150 may include various conduits, valves, and flow controls configured to provide at least a portion of the exhaust gas 152, 184 (e.g., EGR flow) to the intake section 40 for recirculation through the compressor section 42. The exhaust gas 152, 184 may be extracted at various locations and used for one of the fluids of the fluid supply system 94, which in turn may supply the exhaust gas 152, 184 for use in the isothermal expansion system 18 as a barrier gas flow as discussed in further detail below.

In certain embodiments, the gas turbine system 12 includes an air separation unit (ASU) 210 configured to receive an air intake flow and separate the air into constituent gases, such as oxygen 212 for supply to the oxidant supply system 92 and nitrogen 214 for supply to the fluid supply system 94. The oxygen 212 and the nitrogen 214 also may be used in other applications throughout the combined cycle system 10. However, in some embodiments, the ASU 210 may be excluded from the combined cycle system 10.

In the illustrated embodiment, the combined cycle system 10 also includes a controller 220 coupled to the gas turbine system 12, the steam turbine system 14, the HRSG 16, the isothermal expansion system 18, the gas treatment system 190, the fluid system 88, the EGR system 150, the compression system 106, the ASU 210, and various sensors 220 distributed throughout the combined cycle system 10. In the illustrated embodiment, the controller 220 includes one or more processors 224, memory 226, instructions 228 stored on the memory 226 and executable by the processor 224, and communication circuitry 230 configured to communicate with the sensors 222 and various equipment throughout the combined cycle system 10. For example, the controller 222 is configured to control the fluid supply (e.g., fuel, oxidant, and fluid) from the fluid system 88 to the combustor section 44 and the isothermal expansion system 18. In certain embodiments, the controller 222 is configured to control the fuel, oxidant, and fluid supply systems 90, 92, and 94 to control flows of fuel, oxidant, and fluid (e.g., barrier fluid) to the isothermal expansion system 18 to help provide an isothermal expansion of the combustion gas 112 through the turbine blade sets 140 and/or 142.

The controller 220 may store one or more control modes (e.g., isothermal control mode, part load control mode, full load control mode, or a combination thereof) on the memory 226 for execution by the processors 224. The isothermal control mode is configured to control the isothermal expansion system 18, including the fluid injectors 246, to provide variable axial positions of combustion to help reduce temperature variations and facilitate isothermal expansion through the turbine blade sets 140 and/or 142. As used herein, the fluid injectors 246 are intended to include fuel injectors and multi-fluid injectors that inject fuel, oxidant, and a barrier gas. Thus, any discussion of fluids associated with the fluid injectors 246 is intended to include fuel or a suitable fluid mixture to facilitate combustion. The isothermal control mode also may include and/or coordinate with the part load control mode and the full load control mode, such that the isothermal expansion system 18 is adjusted to account for changes in operating parameters (e.g., changes in the pressure ratio across the compressor section 42) due to changes in the load on the gas turbine system 12. As discussed in further detail below, the isothermal control mode (e.g., via the part and full load control modes) may enable changes in the axial range of the variable axial positions of combustion over the turbine blade sets 140 and/or 142 in response to changes in the load on the gas turbine system 12.

For example, the isothermal control mode (e.g., via the part and full load control modes) may enable changes in the axial range of the variable axial positions of combustion at least by varying an axial distance between an upstream end and a downstream end of the axial range, varying an upstream axial position of the upstream end of the axial range, varying a downstream axial position of the downstream end of the axial range, or a combination thereof. These changes in the axial range may be achieved by varying the fluid flow (e.g., fuel flow, oxidant flow, and/or barrier gas flow) to either (A) move the axial positions of combustion further upstream away from the trailing edges of the turbine blades 118 in response to decreases in the load on the gas turbine system 12 or (B) move the axial positions of combustion downstream toward the trailing edges of the turbine blades 118 in response to increases in the load on the gas turbine system 12.

The sensors 222 (designated with an "S") are configured to monitor various operational parameters of the combined cycle system 10. In certain embodiments, the sensors 222 include temperature sensors, pressure sensors, flow rate sensors, fluid composition sensors (e.g., gas composition sensors), vibration sensors, clearance sensors, speed sensors, humidity and/or moisture sensors, or any combination thereof. The sensors 222 may monitor the parameters (e.g., temperature, pressure, flow rate, and fluid composition) at one or more locations of the compressor section 42, the combustor section 44, the turbine section 46, the isothermal expansion system 18, or any combination thereof.

For example, the sensors 222 may monitor compressor parameters (e.g., pressure ratio between the inlet and outlet of the compressor section 42), combustion gas parameters (e.g., firing temperature and combustion dynamics), turbine parameters (e.g., temperature and pressure at each turbine stage, the turbine inlet, and the turbine exhaust), and exhaust gas emissions. In the illustrated embodiment, the sensors 222 may monitor the expansion of the combustion gas 112 in the turbine section 46, such as the turbine blade sets 140 and 142, to enable the controller 220 to monitor and control additional combustion and a temperature distribution in the turbine blade sets 140 and 142 to enable the isothermal expansion. By further example, the exhaust gas emissions monitored by the sensors 222 may include carbon oxides ($CO_X$) such as carbon dioxide ($CO_2$) and carbon monoxide (CO), nitrogen oxides ($NO_X$) such as nitrogen dioxide ($NO_2$), sulfur oxides ($SO_X$) such as sulfur dioxide ($SO_2$), unburnt hydrocarbons, particulate matter, and other undesirable exhaust emissions.

In the illustrated embodiment, the isothermal expansion system 18 is configured to provide isothermal expansion across at least one or more turbine stages 122 of the turbine section 46, such as the turbine blade set 140 and/or the turbine blade set 142. The isothermal expansion system 18 may, for example, provide the isothermal expansion across the turbine blade sets 140 and 142 in a counter-rotating configuration of the turbine blades 118. The isothermal expansion system 18 may include a distribution system 240 coupled to the fluid system 88 and a fluid manifold 242. The distribution system 240 may include a plurality of distribution components 244, such as valves, pressure regulators, fluid manifolds, flow controls, sensors, one or more fluid circuits, or any combination thereof. The isothermal expansion system 18 includes a plurality of fluid circuits 254, wherein each fluid circuit 254 includes one or more valves 256 to enable flow control by the controller 220. The fluid circuits 254 may be included with and/or extend between the fluid system 88, the distribution system 240, and the fluid manifold 242.

The number of fluid circuits 254 may correspond to a number of different axial positions of heat release of combustion, which may include at least 2 to 1000, 5 to 500, 10 to 100, a number equal to a number of the turbine vanes 120, or a number equal to an axial length of the turbine vane 120 divided by a desired axial spacing (e.g., 1, 2, 3, 4, 5, 6, 7, 8, 9, 10, 15, 20, 25, 30, 40, or 50 mm) of the fluid injectors 246. The fluid circuits 254 may include fuel circuits, oxidant circuits, barrier fluid circuits, mixed fluid circuits, or any combination thereof. For example, the fluid circuits 254 may include a plurality of fuel circuits coupled to the fuel supply system 90, a plurality of oxidant circuits coupled to the oxidant supply system 92, and a plurality of fluid circuits (e.g., barrier fluid circuits) coupled to the fluid supply system 94. In certain embodiments, the distribution components 244 may include one or fluid mixers or mixing chambers, which are configured to mix the fluids from the fluid system 88 before the fluids are supplied to the fluid manifold 242 coupled to the turbine section 46. Accordingly, the distribution system 240 may be configured to independently or collectively supply the fuel, the oxidant, and or the fluid (e.g., barrier fluid) to the fluid manifold 242 along the turbine blade set 140 and/or the turbine blade set 142.

The isothermal expansion system 18 includes a plurality of combustion control features on the turbine vanes 120 and the turbine blades 118. The isothermal expansion system 18 may include a plurality of fluid injectors 246 disposed in the turbine vanes 120 of a turbine vane set 248 upstream of the turbine blade set 140 and/or the turbine blade set 142. In certain embodiments, the isothermal expansion system 18 also may include one or more flame stabilizers 250 disposed along each of the turbine blades 118 in the turbine blade set 140 and/or in the turbine blade set 142. In the illustrated embodiment, the fluid injectors 246 in the turbine vane set 248 and the flame stabilizers 250 in the turbine blade sets 140 and, if present, 142 are all part of a common turbine stage 252. For example, the common turbine stage 252 may be an inlet, or first, turbine stage of the turbine section 46. In some embodiments, the isothermal expansion system 18 may be disposed in one or more turbine stages 122 downstream from the inlet turbine stage. Additionally, the isothermal expansion system 18, if used in multiple turbine stages 122, may have the same or different configurations from one stage to another in the turbine stages 122.

As discussed below, the fluid injectors 246 are configured to provide a combustible mixture to generate combustion within the turbine blade sets 140 and 142. Each fluid injector 246 may include one or more fluid injection ports, such as a fuel injection port, an oxidant injection port, and/or a fluid injection port (e.g., barrier fluid injection port). The fluid injectors 246 may be configured to inject a fuel-oxidant mixture (e.g., premixed upstream in a mixing chamber) and/or separately inject flows of fuel, oxidant, and fluid for subsequent mixing downstream (e.g., along the turbine blades 118 in the turbine blade sets 140 and/or 142). In certain embodiments, the fluid injectors 246 are coupled to the plurality of fluid circuits 254 having valves 256 to enable variable control of the fluid injection. The isothermal expansion system 18 also may include one or more flame stabilizers 250 disposed along each of the turbine blades 118 in the turbine blade sets 140 and 142. The flame stabilizers 250 may include structural features configured to help hold and/or stabilize the flame in a particular position (e.g., axial position and radial position) along the turbine blades 118. The fluid injectors 246 on the turbine vanes 120 and/or the flame stabilizers 250 on the turbine blades 118 are configured to control a distribution of flames (and associated heat release) at multiple positions (e.g., axial positions and radial positions) between leading and trailing edges of the turbine blades 118, thereby providing a substantially uniform temperature while expanding the combustion gas 112 through the turbine blade sets 140 and 142 (e.g., isothermal expansion). As appreciated, the isothermal expansion improves efficiency and performance of the gas turbine system 12.

Figure 2:
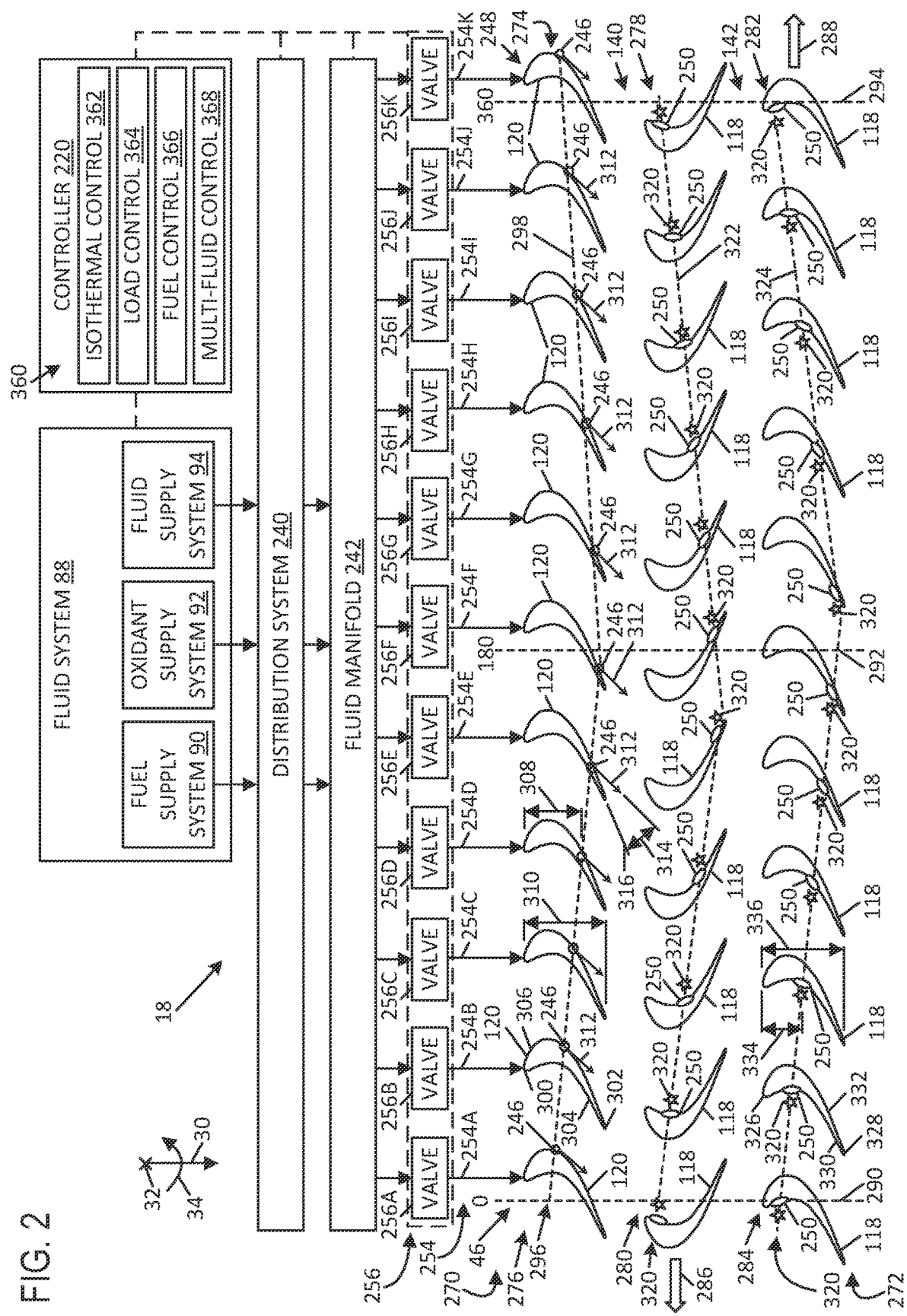
FIG. 2 is a schematic of an embodiment of a portion of a turbine section of the gas turbine system of FIG. 1, further illustrating details of the isothermal expansion system having a variable injection system with fluid injectors and a variable stabilizer system with flame stabilizers.

FIG. 2 is a schematic of an embodiment of a portion of the turbine section 46 of FIG. 1, further illustrating details of the isothermal expansion system 18 having a variable injection system 270 with the fluid circuits 254 coupled to the fluid injectors 246 and a variable stabilizer system 272 with the flame stabilizers 250. As discussed below, the variable injection system 270 has the fluid injectors 246 disposed in varying axial positions within the turbine stage expansion to help vary axial positions of heat release from combustion along the turbine blades 118. Additionally, the variable stabilizer system 272 has the flame stabilizers 250 disposed in varying axial positions within the turbine stage expansion to help vary axial positions of heat release from combustion along the turbine blades 118 within the turbine stage. In certain embodiments, the flame stabilizers 250 may be excluded while controlling the varying axial positions of heat release with the fluid injectors 246. The fluid injectors 246 also may incorporate other controls to facilitate the varying axial positions of heat release, such as by controlling the fluid flow rates of fuel, oxidant, and/or fluid (e.g., barrier fluid) from one fluid injector 246 to another. The details of the isothermal expansion system 18 are discussed in further detail below after describing the arrangement of turbine vanes 120 and turbine blades 118.

As illustrated, the portion of the turbine section 46 (e.g., turbine stage 252) having the isothermal expansion system 18 includes the turbine vane set 248 having a circumferential arrangement 274 of the vanes 120 at an axial position 276 along the rotational axis 36, the turbine blade set 140 having a circumferential arrangement 278 of the turbine blades 118 at an axial position 280 along the rotational axis 36, and the turbine blade set 142 having a circumferential arrangement 282 of the blades 118 at an axial position 284 along the rotational axis 36. The axial position 276 of the circumferential arrangement 274 of vanes 120 (i.e., turbine vane set 248) is disposed upstream from the axial positions 280 and 284 of the circumferential arrangements 278 and 282 of the blades 118 (i.e., turbine blade sets 140 and 142). The axial position 280 of the circumferential arrangement 278 of blades 118 (i.e., turbine blade set 140) is disposed upstream from the axial position 284 of the circumferential arrangement 282 of blades 118 (i.e., turbine blade set 142).

In the turbine vane set 248, the circumferential arrangement 274 has the vanes 120 generally aligned with one another at the axial position 276, such that the vanes 120 axially overlap one another along the rotational axis 36. Similarly, in the turbine blade set 140, the circumferential arrangement 278 has the blades 118 generally aligned with one another at the axial position 280, such that the blades 118 axially overlap one another along the rotational axis 36. Finally, in the turbine blade set 142, the circumferential arrangement 282 has the blades 118 generally aligned with one another at the axial position 284, such that the blades 118 axially overlap one another along the rotational axis 36. In the illustrated embodiment, the vanes 120 are disposed in stationary positions, the blades 118 in the circumferential arrangement 278 in the turbine blade set 140 rotate about the rotational axis 36 in a rotational direction 286, and the blades 118 in the circumferential arrangement 282 in the turbine blade set 142 rotate in a rotational direction 288 about the rotational axis 36. As illustrated, the rotational directions 286 and 288 are opposite or counter to one another, such that the blades 118 in the turbine blade sets 140 and 142 are counter-rotated to one another (i.e., counter-rotating turbine blades 118).

For reference purposes, a vertical dashed line 290 represents 0 degrees about the rotational axis 36, a vertical dashed line 292 represents 180 degrees about the rotational axis 36, and a vertical dashed line 294 represents 360 degrees about the rotational axis 36. Accordingly, the illustrated vanes 120 and blades 118 are shown in various angular or circumferential positions 360 degrees about the rotational axis 36. As discussed in further detail below, the isothermal expansion system 18 has the variable injection system 270 and the variable stabilizer system 272 configured to vary a heat release of combustion occurring in the illustrated portion of the turbine section 46 (i.e., within the turbine stage expansion of the turbine stage 252).

In the illustrated embodiment, the variable injection system 270 has the fluid injectors 246 disposed on the vanes 120 in variable injection positions 296 (e.g., spatially distributed injection positions) as indicated by dashed line 298. The dashed line 298 gradually changes in axial position from 0 to 180 degrees as indicated by dashed lines 290 and 292 and from 180 to 360 degrees as indicated by dashed lines 292 and 294. Each vane 120 has a leading edge 300, a trailing edge 302, a pressure side or surface 304 extending from the leading edge 300 to the trailing edge 302, and a suction side or surface 306 extending from the leading edge 300 to the trailing edge 302. The variable injection positions 296 of the fluid injectors 246 may vary in position (e.g., axial position, radial position) from the leading edge 300 to the trailing edge 302 of each respective vane 120.

For example, the variable injection positions 296 may include 2 to 1000 or more axial and radial positions, such as at least equal to or greater than 2, 3, 4, 5, 6, 7, 8, 9, 10, 20, 30, 40, 50, 100, 200, or more axial and radial positions. For example, the vanes 120 closer to 0 and 360 degrees may have the fluid injectors 246 disposed at or close to the leading edge 300, the vanes 120 disposed close to the 180-degree position may have the fluid injectors 246 disposed closer to the trailing edge 302, and the vanes 120 disposed between 0 to 180 degrees and between 180 to 360 degrees may have the fluid injectors 246 disposed midway or at intermediate positions between the leading and trailing edges 300 and 302. Thus, the variable injection positions 296 of the fluid injectors 246 may vary in an axial distance from the leading edge 300 to the fluid injector 246 and relative to a total axial length 310 of the turbine blade 120 from the leading edge 300 to the trailing edge 302 along the rotational axis 36. The variable injection positions 296 of the fluid injectors 246 may vary in a periodic fashion from 0 degrees to 360 degrees, e.g., the traversal of dashed line 298 through lines 290, 292 and 294. Dashed line 298 may represent a sine-like, cosine-like or sawtooth-like periodic variation having one period of variation around rotational axis 36 with axial position 276 varying from near the leading edge 300 to near the trailing edge 302 through that one period. Other embodiments may include periodic variations with multiple periods of variation around rotational axis 36. For example, embodiments may include, but are not limited to, sine-like or sawtooth-like variations with multiple periods. Additionally, the variable injection positions 296 may have variable radial positions along the radial direction or axis 32.

The fluid injectors 246 also may have an injection axis or injection direction 312 disposed at an angle 314 relative to a tangent line 316 at the fluid injector 246. In certain embodiments, the angle 314 may be constant throughout the vanes 120 in the turbine vane set 248. Alternately, the angle 314 may be variable from one fluid injector 246 to another throughout the vanes 120 in the turbine vane set 248. For example, the angle 314 may be constant or variable for multiple fluid injectors 246 on each individual vane 120 and/or between fluid injectors 246 on different vanes 120. The fluid injectors 246 also may be constant or variable in other ways, including a cross-sectional area of fluid injection ports, a geometry of fluid injection ports (e.g., circular, oval, rectangular, etc.), a fluid flow rate, or any combination thereof, from one fluid injector 246 to another and/or from one vane 120 to another. For example, the fluid injectors 246 may have a total cross-section flow area of fluid injection ports that is constant or variable from one fluid injector 246 to another and/or from one vane 120 to another. Additionally, in certain embodiments, each fluid injector 246 includes multiple fluid injection ports, such as a fuel injection port, an oxidant injection port, and a barrier fluid injection port, wherein the cross-sectional areas (or ratios of cross-sectional areas) of the fluid injection ports may be constant or variable from one fluid injector 246 to another and/or from one vane 120 to another. Similarly, in embodiments with multiple fluid injection ports per fluid injector 246, a ratio of fluid flow rates (e.g., fuel, oxidant, and fluid) may be constant or variable from one fluid injector 246 to another and/or from one vane 120 to another.

Each of the vanes 120 is fluidly coupled to one or more fluid circuits 254 having valves 256 coupled to the controller 220. The fluid circuits 254 may be part of, extend through, and/or fluidly couple the fluid system 88, the distribution system 240, and the fluid manifold 242 as discussed above with reference to FIG. 1. Using the fluid circuits 254 and the valves 256, the distribution system 240 is configured to supply one or more of the fluids (e.g., fuel, oxidant, and fluid) from the fluid system 88 (e.g., supply systems 90, 92, and 94) to the fluid manifold 242, which then routes the fluids to each of the fluid injectors 246 in the vanes 120. For example, the distribution system 240 may route the fuel from the fuel supply system 90 through the fluid manifold 242 to the various fluid injectors 246 in the vanes 120 via one or more fuel circuits of the fluid circuits 254. The distribution system 240 may route the oxidant from the oxidant supply system 92 through the fluid manifold 242 to the various fluid injectors 246 in the vanes 120 via one or more oxidant circuits of the fluid circuits 254. The distribution system 240 may route the fluid (e.g., barrier fluid) from the fluid supply system 94 through the fluid manifold 242 to the various fluid injectors 246 in the vanes 120 via one or more fluid circuits (e.g., barrier fluid circuits) of the fluid circuits 254.

In certain embodiments, the fuel circuits, the oxidant circuits, and the fluid circuits are separate from one another (i.e., separate fluid circuits 254 and fluid manifolds 242), such that the fluid injectors 246 separately inject flows of the fuel, oxidant, and fluid into the turbine section 46. For example, the distribution system 240 may route the fuel, the oxidant, and the fluid from the supply systems 90, 92, and 94 through the fluid manifolds 242 to multiple fluid ports at each of the fluid injectors 246 using separate fluid circuits 254 as discussed in further detail below. However, in some embodiments, the distribution system 240 mixes the one or more fluids (e.g., fuel, oxidant, and/or fluid) from the supply systems 90, 92, and 94, thereby producing a fluid mixture (e.g., fuel-oxidant mixture) for distribution to the fluid injectors 246 through mixed fluid manifolds and circuits of the fluid circuits 254. The controller 220 also may control the fluid flow rates of the various fluids to the fluid injectors 246 to help vary the heat release downstream in the turbine blade sets 140 and 142.

In the illustrated embodiment, the variable injection system 270 includes a plurality of fluid circuits 254 (e.g., 254A, 254B, 254C, 254D, 254E, 254F, 254G, 254H, 254I, 254J, and 254K) and associated valves 256 (e.g., 256A, 256B, 256C, 256D, 256E, 256F, 256G, 256H, 256I, 256J, and 256K) coupled to fluid injectors 246 on multiple turbine vanes 120. Each of the illustrated fluid circuits 254 may represent a single fluid circuit (e.g., single fuel, oxidant, or barrier gas circuit) or multiple fluid circuits (e.g., multiple fuel, oxidant, and/or barrier gas circuits). For example, each of the turbine vanes 120 may couple with a single fluid circuit 254 or multiple fluid circuits 254, each of the fluid circuits 254 may couple with a single turbine vane 120 or multiple turbine vanes 120, and each of the fluid circuits 254 may couple with a single fluid injector 246 or multiple fluid injectors 246. In the illustrated embodiment, each of the turbine vanes 120 has one or more fluid injectors 246 (e.g., 1, 2, 3, 4, 5, 6, 7, 8, 9, 10, or more) disposed at a different one of the variable injection positions 296, and each of the turbine vanes 120 is coupled to a different one or more of the fluid circuits 254 to supply a fluid flow (e.g., fuel flow) or multiple fluid flows (e.g., fuel, oxidant, and barrier gas flows) to the fluid injector 246. For each turbine vane 120, the fluid injectors 246 may be disposed at a common axial position as discussed below with reference to FIGS. 4-6 and 10-12 or variable axial positions as discussed below with reference to FIGS. 7-9. In certain embodiments, the variable injection positions 296 are at least partially or entirely different from one turbine vane 120 to another.

The variable injection system 270 and the variable stabilizer system 272 are configured to enable and control variable heat release or combustion positions 320 (e.g., spatially distributed heat release) along the turbine blade sets 140 and 142 within the turbine stage expansion. Accordingly, the isothermal expansion system 18 may enable and control the variable heat release or combustion positions 320 among the circumferential arrangement 278 of blades 118 in the turbine blade set 140 and/or the circumferential arrangement 282 of blades 118 in the turbine blade set 142. As illustrated, the variable heat release or combustion positions 320 are depicted by stars along a dashed line 322 in the turbine blade set 140 and a dashed line 324 in the turbine blade set 142, respectively. The dashed lines 322 and 324 generally vary in axial positions between 0 to 180 degrees as illustrated by dashed lines 290 and 292 and between 180 to 360 degrees as illustrated by dashed lines 292 and 294. The dashed lines 322 and 324 represent one possible embodiment of variations (e.g., spatial variations) in the variable heat release or combustion positions 320. However, the dashed lines 322 and 324 may vary in other ways, such as angled lines, curved lines, wavy or zigzagging lines, randomly or irregularly varying lines, or any combination thereof. For example, dashed lines 322 and 324 may vary in a periodic fashion from 0 degrees to 360 degrees, e.g., the traversal of dashed lines 322 and 324 through lines 290, 292 and 294. Dashed lines 298 may represent a sine-like, cosine-like or sawtooth-like periodic variation having one period of variation around rotational axis 36 with axial positions 280 and 284 varying from near leading edges 326 to trailing edges 328 through that one period. Other embodiments can include periodic variations with multiple periods of variation around rotational axis 36. For example, embodiments can include, but are not limited to, a sine-like or sawtooth-like variation with multiple periods.

As illustrated in FIG. 2, each of the blades 118 in the circumferential arrangements 278 and 282 include a leading edge 326, a trailing edge 328, a pressure side or surface 330 extending from the leading edge 326 to the trailing edge 328, and a suction side or surface 332 extending from the leading edge 326 to the trailing edge 328. The variable heat release or combustion positions 320 of combustion occurring in the turbine section 46 downstream from the fluid injectors 246 varies axially between the leading edge 326 and the trailing edge 328 of the blades 118 in the circumferential arrangement 278 of blades 118 and/or the circumferential arrangement 282 of blades 118. For example, the variable heat release or combustion positions 320 may be defined with reference to a reference position, such as the leading edge 326. Additionally, an axial distance 334 may be defined from the reference position (e.g., leading edge 326) to each of the variable heat release or combustion positions 320, wherein the axial distance 334 is a portion of a total axial length 336 of the blade 118 from the leading edge 326 to the trailing edge 328.

In certain embodiments, one or more of the variable heat release or combustion positions 320 may be disposed directly at or adjacent the leading edge 326 as illustrated by the blades 118 at 0 and 360 degrees (e.g., axial distance 334 of 0), positions at or adjacent the trailing edge 328 as indicated by positions near 180 degrees (e.g., axial distance 334 equal to total axial length 336), or axial distances 334 at intermediate locations between the leading edge 326 and the trailing edge 328 of the blades 118. Accordingly, the variable heat release or combustion positions 320 may include axial distances 334 that vary from one blade 118 to another 360 degrees about the rotational axis 336 in each of the circumferential arrangements 278 and 282. The variable heat release or combustion positions 320 may be axially spaced apart from one another by equal spacings, unequal spacings, or a combination thereof. For example, equal spacings may be defined by the total axial length 336 divided by N, wherein N may be any number from 2 to 1000, 2 to 500, 2 to 100, or 2 to 50. For example, N may be at least equal to or greater than 2, 3, 4, 5, 6, 7, 8, 9, 10, 11, 12, 13, 14, 15, 16, 17, 18, 19, 20, or more.

In certain embodiments, the variable heat release or combustion positions 320 may be achieved at least partially or entirely by the variable injection system 270 having the variable injection positions 296. For example, the varying axial distances 308 of the fluid injectors 246 may change the axial distance 334 of the variable heat release or combustion positions 320 along the blades 118 downstream from the vanes 120. Additionally, the variable injection system 270 may vary the fluid injectors 246 by cross-sectional areas, geometries, fluid flow rates, or other operational parameters configured to adjust the distance until heat release or combustion at the turbine blade sets 140 and 142 occurs, as indicated by the variable heat release or combustion positions 320.

The variable injection system 270 of the isothermal expansion system 18 may be controlled by the controller 220 in one or more of a plurality of control modes 360, such as an isothermal control mode 362, a load control mode 364, a fuel control mode 366, and/or a multi-fluid control mode 368. The isothermal control mode 362 is configured to control the variable injection system 270 to control fluid flows to the plurality of fluid injectors 246 to vary the axial positions of combustion (e.g., variable heat release or combustion positions 320) to reduce temperature variations across the turbine blades 118 within the turbine stage expansion, thereby providing isothermal expansion in the turbine stage 252. The load control mode 364, which coordinates with and/or is part of the isothermal control mode 362, is configured to control the variable injection system 270 to control fluid flows to the plurality of fluid injectors 246 to vary an axial range of the variable axial positions of combustion 320 in response to changes in a load on the gas turbine system 12 (e.g., increase or decrease in the load). The load may be an electrical generator load, and thus the changes in the load may include changes in the electrical generator load. The load control mode 362 is discussed in further detail below. The fuel control mode 366, which coordinates with and/or is part of the isothermal control mode 362, is configured to control the variable injection system 270 to control fuel flows to the plurality of fluid injectors 246 (e.g., fuel only injectors) to vary the axial positions of combustion 320 within the turbine stage expansion. The multi-fluid control mode 368, which coordinates with and/or is part of the isothermal control mode 362, is configured to control the variable injection system 270 to control multiple fluid flows (e.g., fuel, oxidant, and barrier gas flows) to the plurality of fluid injectors 246 (e.g., multi-fluid injectors) to vary the axial positions of combustion 320 within the turbine stage expansion as discussed in further detail below with reference to FIGS. 13, 14, and 17.

The controller 220 is configured to control the variable injection system 270 with the plurality of control modes 360 independently or in any combination with one another to vary the axial positions of combustion (e.g., variable heat release or combustion positions 320) and/or to vary the axial range of different axial positions of combustion 320 within the turbine stage expansion. For example, in the load control mode 364, the controller 220 is configured to control the variable injection system 270 to vary the axial range of the different axial positions of combustion by varying an axial distance between an upstream end and a downstream end of the axial range, varying an upstream axial position of the upstream end of the axial range, varying a downstream axial position of the downstream end of the axial range, or a combination thereof. In the illustrated embodiment, the controller 220 is configured to control the variable injection system 270 to vary the axial range of the different axial positions of combustion between leading and trailing edges 326 and 328 of the plurality of turbine blades 118 in the turbine stage 252.

For example, the controller 220 is configured to control the variable injection system 270 to vary the axial range of the different axial positions of combustion at least by varying the downstream axial position of the downstream end of the axial range (e.g., relative to the trailing edges 328), including (A) moving the downstream axial position of the downstream end of the axial range in an upstream direction in response to the change in the load comprising a decrease in the load on the gas turbine system 12, or (B) moving the downstream axial position of the downstream end of the axial range in a downstream direction in response to the change in the load comprising an increase in the load on the gas turbine system 12.

By further example, the controller 220 is configured to control the variable injection system 270 to vary the axial range of the different axial positions of combustion at least by varying the upstream axial position of the upstream end of the axial range (e.g., relative to the leading edges 326), including (A) moving the upstream axial position of the upstream end of the axial range in an upstream direction in response to the change in the load comprising a decrease in the load on the gas turbine system 12, or (B) moving the upstream axial position of the upstream end of the axial range in a downstream direction in response to the change in the load comprising an increase in the load on the gas turbine system 12.

By further example, the controller 220 is configured to control the variable injection system 270 to vary the axial range of the different axial positions of combustion at least by (A) reducing the axial range of the different axial positions of combustion in response to the change in the load comprising a decrease in the load on the gas turbine system 12, or (B) increasing the axial range of the different axial positions of combustion in response to the change in the load comprising an increase in the load on the gas turbine system 12. The various controls of the axial range of the different axial positions of combustion may be achieved by the controller 220 controlling (e.g., increasing, decreasing, starting, or stopping) fluid flows through the plurality of fluid circuits 254 to the plurality of fluid injectors 246 on the plurality of turbine vanes 120.

In operation, in the embodiment of FIG. 2, the controller 220 is configured to control the variable injection system 270 to control the fluid flows to the plurality of fluid injectors 246 via the plurality of fluid circuits 254 and the associated valves 256, thereby selectively varying (e.g., starting, increasing, decreasing, or stopping) the fluid flows at the variable injection positions 296 to achieve corresponding changes in the variable heat release or combustion positions 320. The variable heat release or combustion positions 320 along the turbine blades 118 may be a function of the variable injection positions 296, such that upstream variable injection positions 296 correspond to upstream combustion positions 320, downstream variable injection positions 296 correspond to downstream combustion positions 320, and intermediate variable injection positions 296 correspond to intermediate combustion positions 320. The variable heat release or combustion positions 320, and the axial range of such positions 320, is therefore controlled by selectively varying the fluid flows to the fluid injectors 246 at the variable injection positions 296.

In certain embodiments, the load control mode 364 of the controller 220 may respond to a decreasing load on the gas turbine engine 12 by controlling the valves 256 along the fluid circuits 254 to gradually decrease and/or stop the fluid flows to the fluid injectors 246 in a sequence based on the variable injection positions 296 (e.g., in an upstream direction starting from the downstream fluid injectors 246 and moving toward the upstream fluid injectors 246). For example, the controller 220 may gradually close the valves 256 along the fluid circuits 254 in the following sequence: (1) valve 256F along fluid circuit 254F, (2) valve 256G along fluid circuit 254G, (3) valve 256E along fluid circuit 254E, (4) valve 256H along fluid circuit 254H, (5) valve 256D along fluid circuit 254D, (6) valve 256I along fluid circuit 254I, (7) valve 256C along fluid circuit 254C, (8) valve 256J along fluid circuit 254J, (9) valve 256B along fluid circuit 254B, (10) valve 256K along fluid circuit 254K, and (11) valve 256A along fluid circuit 254A. The foregoing sequence gradually moves the variable heat release or combustion positions 320 along the turbine blades 118 in an upstream direction away from the trailing edges 328 toward the leading edges 326 of the turbine blades 118, thereby also reducing the axial range of the combustion positions 320.

In certain embodiments, the load control mode 364 of the controller 220 may respond to an increasing load on the gas turbine engine 12 by controlling the valves 256 along the fluid circuits 254 to gradually start or increase the fluid flows to the fluid injectors 246 in a sequence based on the variable injection positions 296 (e.g., in a downstream direction starting from the upstream fluid injectors 246 and moving toward the downstream fluid injectors 246). For example, the controller 220 may gradually open the valves 256 along the fluid circuits 254 in the following sequence: (1) valve 256A along fluid circuit 254A, (2) valve 256K along fluid circuit 254K, (3) valve 256B along fluid circuit 254B, (4) valve 256J along fluid circuit 254J, (5) valve 256C along fluid circuit 254C, (6) valve 256I along fluid circuit 254I, (7) valve 256D along fluid circuit 254D, (8) valve 256H along fluid circuit 254H, (9) valve 256E along fluid circuit 254E, (10) valve 256G along fluid circuit 254G, and (11) valve 256F along fluid circuit 254F. The foregoing sequence gradually moves the variable heat release or combustion positions 320 along the turbine blades 118 in a downstream direction from the leading edges 326 toward the trailing edges 328 of the turbine blades 118, thereby also increasing the axial range of the combustion positions 320.

Figure 3:
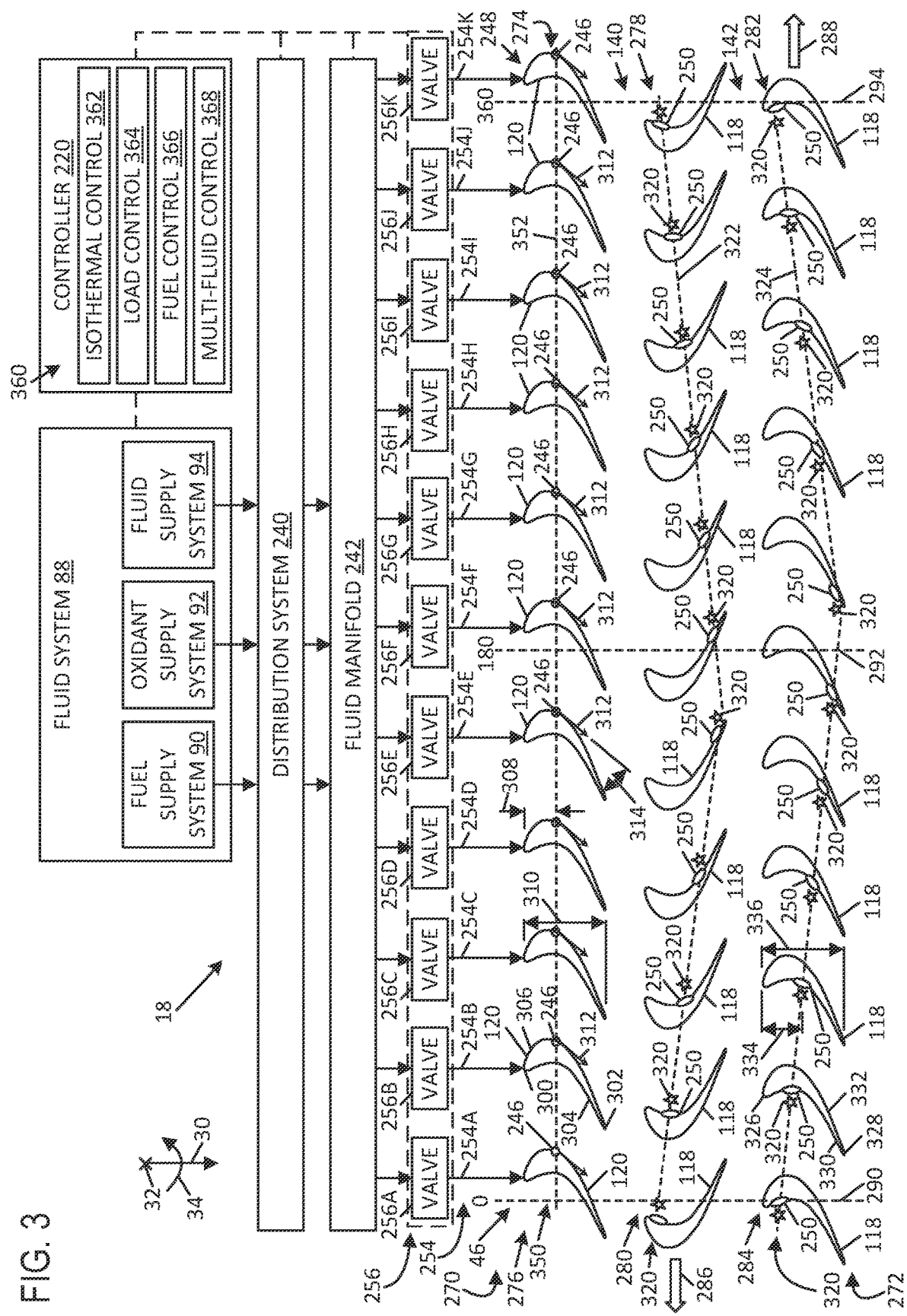
FIG. 3 is a schematic of an embodiment of a portion of the turbine section of the gas turbine system of FIG. 1, further illustrating details of the isothermal expansion system.

Additionally, in embodiments of the variable injection system 270 with the variable injection positions 296 of FIG. 2 or constant injection positions 350 of FIG. 3, the load control mode 364 of the controller 220 may respond to a varying load on the gas turbine engine 12 by controlling the valves 256 along the fluid circuits 254 to vary a range of flow rates to the different fluid injectors 246, thereby varying the axial range of the combustion positions 320 along the turbine blades 118 within the turbine stage expansion. For example, for each of the fluid injectors 246, the controller 220 may gradually close the valves 256 along the fluid circuits 254 to decrease the flow rates to the fluid injectors 246, thereby gradually moving the corresponding combustion position 320 in an upstream direction away from the trailing edges 328 toward the leading edges 326 of the turbine blades 118. By further example, for each of the fluid injectors 246, the controller 220 may gradually open the valves 256 along the fluid circuits 254 to increase the flow rates to the fluid injectors 246, thereby gradually moving the corresponding combustion position 320 in a downstream direction away from the leading edges 326 toward the trailing edges 328 of the turbine blades 118. By using the foregoing increases and decreases in flow rates to the fluid injectors 246, the controller 220 is configured to control the variable injection system 270 to vary the number of different combustion positions 320, vary the axial distances 334 to the different combustion positions 320, vary the axial range of the different combustion positions 320, vary the downstream end of the axial range, vary the upstream end of the axial range, or any combination thereof.

In certain embodiments, the variable heat release or combustion positions 320 may be at least partially or entirely controlled by flames stabilizers 250 of the variable stabilizer system 272. For example, the flame stabilizers 250 may be disposed on each of the blades 118 in the circumferential arrangement 278 and/or the circumferential arrangement 282 in various positions (e.g., axial positions and radial positions) along the blades 118. For example, the various positions of the flame stabilizers 250 may include 2 to 1000 or more axial and radial positions, such as at least equal to or greater than 2, 3, 4, 5, 6, 7, 8, 9, 10, 20, 30, 40, 50, 100, 200, or more axial and radial positions. By further example, the flame stabilizers 250 may be disposed at the variable heat release or combustion positions 320 at the axial distances 334 as indicated by dashed lines 322 and 324 to help distribute the heat release of combustion occurring in the turbine blade sets 140 and 142.

In certain embodiments, the flames stabilizers 250 may be stationary or fixed in position relative to each of the turbine blades 118. As discussed in further detail below, the flame stabilizers 250 include structural features on the surface of the blades 118, thereby facilitating a disruption or low velocity zone along the blades 118 to facilitate flame holding or stabilization along the blades 118 in different axial positions or distances 334 as depicted by the variable heat release or combustion positions 320. The flame stabilizers 250 may be identical structures disposed at different axial distances 334, different geometries or shapes at different or common axial distances 334, or any combination thereof. For example, as discussed in further detail below, the flame stabilizers 250 may include one or more recesses, one or more protrusions, or any combination thereof. Thus, the flame stabilizers 250 with variations from one blade 118 to another in the circumferential arrangement 278 and/or the circumferential arrangement 282 may be used to provide the variable heat release or combustion positions 320.

The variable heat release or combustion positions 320 achieved by the variable injection system 270 having the variable injection positions 296 and/or the variable stabilizer system 272 having the flames stabilizers 250 are configured to distribute the heat release across the turbine blades 118 to provide a more uniform temperature and isothermal expansion of the hot gas flow through the turbine blade sets 140 and 142. Again, the variable heat release or combustion positions 320 may be achieved at least partially or entirely via the variable injection system 270, which may vary the axial distance 308 to the fluid injectors 246, vary the cross-sectional flow areas, geometries, angles 314, or any combination thereof. Additionally, or alternatively, the variable heat release or combustion positions 320 may be achieved at least partially or entirely via the variable stabilizer system 272, which may vary the axial distances 334 to the flame stabilizers 250, vary the geometries of the flame stabilizers 250, or any combination thereof. Accordingly, the variable injection system 270 and/or the variable stabilizer system 272 are configured to uniformly distribute or average the combustion temperatures across the turbine blade sets 140 and 142 to help provide isothermal expansion in the turbine section 46.

FIG. 3 is a schematic of an embodiment of a portion of the turbine section 46 of FIG. 1, further illustrating details of the isothermal expansion system 18 having the variable injection system 270 and the variable stabilizer system 272. The illustrated embodiment has the variable stabilizer system 272 with substantially the same features as described in detail above with reference to FIG. 2. However, the variable injection system 270 differs from the embodiment of FIG. 2, because the variable injection system 270 of FIG. 3 has the fluid injectors 246 arranged in constant injection positions 350 among the vanes 120 as indicated by dashed line 352. In particular, each vane 120 in the circumferential arrangement 274 of vanes 120 in the turbine vane set 248 may have the fluid injector 246 disposed at the same axial distance 308 from the leading edge 300 of the vane 120.

However, the variable injection system 270 may vary other aspects of the fluid injectors 246 from one vane 120 to another in the circumferential arrangement 274 of vanes 120 in the turbine vane set 248. For example, as discussed above with reference to FIG. 2, the fluid injectors 246 may vary from one vane 120 to another in a cross-sectional flow area, a fluid flow rate, the angle 314 of the injection axis or direction 312, or any combination thereof. For example, if each fluid injector 246 includes a fuel injection port, then the cross-sectional flow area of the fuel injection port may vary from one vane 120 to another. Similarly, if each fluid injector 246 includes multiple fluid injection ports, such as a fuel injection port, a barrier fluid injection port, and an oxidant injection port, then the relative cross-section areas of the different ports for each fluid injectors 246 may vary from one vane 120 to another in the circumferential arrangement 274. Thus, even though the variable injection system 270 of FIG. 3 has constant injection positions 350 at the axial distance 308, the variable injection system 270 has other variations in the fluid injectors 246 to provide the variable heat release or combustion positions 320 at the blades 118 in the turbine blade sets 140 and 142 as discussed above with reference to FIG. 2.

Additionally, the variable stabilizer system 272 may include the flame stabilizers 250 disposed at various axial distances 334 and discussed above with reference to FIG. 2. In the illustrated embodiment, the variable injection system 270 and the variable stabilizer system 272, used alone or in combination with one another, are configured to distribute the heat in a more uniform manner throughout the turbine blade sets 140 and 142, thereby providing a substantially isothermal expansion through the turbine blade sets 140 and 142.

In the illustrated embodiment, the load control mode 364 of the controller 220 may respond to a varying load on the gas turbine engine 12 by controlling the valves 256 along the fluid circuits 254 to vary a range of flow rates to the different fluid injectors 246, thereby varying the axial range of the combustion positions 320 along the turbine blades 118. For example, for each of the fluid injectors 246, the controller 220 may gradually close the valves 256 along the fluid circuits 254 to decrease the flow rates to the fluid injectors 246, thereby gradually moving the corresponding combustion position 320 in an upstream direction away from the trailing edges 328 toward the leading edges 326 of the turbine blades 118. By further example, for each of the fluid injectors 246, the controller 220 may gradually open the valves 256 along the fluid circuits 254 to increase the flow rates to the fluid injectors 246, thereby gradually moving the corresponding combustion position 320 in a downstream direction away from the leading edges 326 toward the trailing edges 328 of the turbine blades 118. By using the foregoing increases and decreases in flow rates to the fluid injectors 246, the controller 220 is configured to control the variable injection system 270 to vary the number of different combustion positions 320, vary the axial distances 334 to the different combustion positions 320, vary the axial range of the different combustion positions 320, vary the downstream end of the axial range, vary the upstream end of the axial range, or any combination thereof.

FIGS. 4-12 are perspective views of embodiments of the vanes 120 of the isothermal expansion system 18 of FIGS. 1-3, further illustrating embodiments of the fluid injectors 246 that may be used alone or in combination with one another in the variable injection positions 296 of FIG. 2 and/or the constant injection positions 350 of FIG. 3. In each of the illustrated embodiments, the vane 120 has a vane body 370 extending in the radial direction 32 from a vane base 372 to a vane tip 374. The vane 120 may have a total radial length 376 from the base 372 to the tip 374, and the fluid injectors 246 may be disposed at multiple radial distances 378 measured from the base 372 in the radial direction 32 toward the tip 374.

In certain embodiments, the vane 120 may include a single fluid injector 246 disposed at a particular radial distance 378. However, in the illustrated embodiments, the vane 120 includes a plurality of the fluid injectors 246 disposed at different radial distances 378 between the base 372 and the tip 374. For example, the radial distances 378 may vary anywhere from directly at the base 372 to directly at the tip 374 and various positions in between. For example, the radial distances 378 may range from 0 to 100, 10 to 90, 20 to 80, 30 to 70, or 40 to 60 percent of the radial length 376 (sometimes referred to as "span"). The fluid injectors 246 may be uniformly spaced in the radial direction, or the fluid injectors 246 may be non-uniformly spaced (e.g., with a greater number of fluid injectors 246 in a particular radial span).

The vane body 370 may have an airfoil shaped geometry defined by the leading edge 300, the trailing edge 302, the pressure side 304, and the suction side 306. In certain embodiments, the vane body 370 may have a cross-sectional area or shape 380 (e.g., airfoil shaped cross-section) that varies or is constant in the radial direction 32 from the base 372 to the tip 374. The number of fluid injectors 246 may include at least 1, 2, 3, 4, 5, 6, 7, 8, 9, 10, or more fluid injectors 246 disposed on the suction side 306 of the vane body 370. As discussed in further detail below, for each embodiment of the vane 120, the axial distance 308 from the leading edge 300 to the fluid injectors 246 may vary or remain constant, a cross-sectional area 382 of the fluid injectors 246 may vary or remain constant, the angle 314 of the injection axis or direction 312 may vary or remain constant, a geometrical shape or geometry may vary or remain constant, a fluid flow rate may vary or remain constant, or any combination thereof, between the fluid injectors 246 on each vane 120.

FIG. 4 is a perspective view of an embodiment of a vane 120 of FIGS. 1-3, wherein a plurality of the fluid injectors 246 are disposed at a constant axial distance 308 from the leading edge 300 as indicated by dashed line 384. In particular, the dashed line 384 may be disposed directly along, adjacent, and/or parallel to the trailing edge 302, such that the dashed line 384 extends in a radial direction 32 at the constant axial distance 308 relative to the leading edge 300. In the illustrated embodiment, the axial distance 308 may be at least 70, 80, 90, or 100 percent of the axial length 310. The vane 120 of FIG. 4 may be used for one or more of the vanes 120 of FIG. 2, wherein other vanes 120 may be disposed at a plurality of different axial distances 308. Additionally, in certain embodiments, the vane 120 of FIG. 4 may be used for each of the vanes 120 at the constant injection positions 350 of FIG. 3. As discussed above, the fluid injectors 246 of FIG. 4 may vary or remain the same relative to one another along the dashed line 384. For example, the fluid injectors 246 may be the same or vary with respect to one another in terms of the cross-sectional area 382, the angle 314 of the injection axis or direction 312, the geometrical shape or geometry, the fluid flow rate, the type of fluid being injected, or any combination thereof.

FIG. 5 is a perspective view of an embodiment of the vane 120 of FIGS. 1-3, wherein a plurality of the fluid injectors 246 are disposed at a constant axial distance 308 from the leading edge 300 as indicated by dashed line 390. The vane 120 of FIG. 5 is similar to the embodiment of FIG. 4; however, the constant axial distance 308 of FIG. 5 is less than the constant axial distance 308 of FIG. 4. In particular, the constant axial distance 308 to the plurality of fluid injectors 246 in FIG. 5 (e.g., the dashed line 390) is at an intermediate position approximately midway between the leading edge 300 and the trailing edge 302 of the vane 120. For example, the constant axial distance 308 may be approximately 30 to 70, 40 to 60, or 50 percent of the axial length 310 from the leading edge 300 to the trailing edge 302. The vane 120 having the fluid injectors 246 disposed along the dashed line 390 of FIG. 5 may be used for one or more of the vanes 120 having the variable injection positions 296 as illustrated in FIG. 2, or each of the vanes 120 having the constant injection positions 350 of FIG. 3. In certain embodiments, the fluid injectors 246 of FIG. 5 may vary or remain the same relative to one another along the dashed line 390. For example, the fluid injectors 246 may be the same or vary with respect to one another in terms of the cross-sectional area 382, the angle 314 of the injection axis or direction 312, the geometrical shape or geometry, the fluid flow rate, the type of fluid being injected, or any combination thereof.

FIG. 6 is a perspective view of an embodiment of the vane 120 of FIGS. 1-3, wherein a plurality of the fluid injectors 246 are disposed at a constant axial distance 308 from the leading edge 300 as indicated by dashed line 400. The vane 120 of FIG. 6 is similar to the embodiments of FIGS. 4 and 5; however, the constant axial distance 308 of FIG. 6 is less than the constant axial distance 308 of FIGS. 4 and 5. In particular, the constant axial distance 308 to the plurality of fluid injectors 246 in FIG. 6 (e.g., the dashed line 400) is directly along, adjacent, and/or parallel to the leading edge 300 of the vane 120. For example, in the illustrated embodiment, the constant axial distance 308 may be between 0 to 50, 0 to 40, 0 to 30, 0 to 20, or 0 to 10 percent of the axial length 310 from the leading edge 300 to the trailing edge 302. The vane 120 having the fluid injectors 246 disposed along the dashed line 400 of FIG. 6 may be used for one or more of the vanes 120 having the variable injection positions 296 of FIG. 2, or each of the vanes 120 having the constant injection positions 350 of FIG. 3. In certain embodiments, the fluid injectors 246 of FIG. 6 may vary or remain the same relative to one another along the dashed line 400. For example, the fluid injectors 246 may be the same or vary with respect to one another in terms of the cross-sectional area 382, the angle 314 of the injection axis or direction 312, the geometrical shape or geometry, the fluid flow rate, the type of fluid being injected, or any combination thereof.

FIG. 7 is a perspective view of an embodiment of the vane 120 of FIGS. 1-3, wherein a plurality of fluid injectors 246 are disposed at variable axial distances 308 from the leading edge 300 along a variable dashed line 410. For example, the variable dashed line 410 may include one or more of a curving line, a zig-zagging or wavy line, an angled line, or any combination thereof, wherein the variable dashed line 410 indicates (or follows) changes in the axial distance 308 relative to the leading edge 300. For example, the variable dashed line 410 may alternatingly turn (e.g., curve) back and forth in opposite axial directions in a uniform (e.g., sinusoidal) or non-uniform (e.g., irregular) manner to define the variable axial distances 308 to the fuel injectors 246.

Accordingly, the fluid injectors 246 are not disposed at a common axial distance 308 from the leading edge 300, but rather the axial distance 308 of the fluid injectors 246 may vary over an axial range 412 relative to the axial length 310 from the leading edge 300 to the trailing edge 302 of the vane 120. The axial range 412 may be equal to or greater than 10, 20, 30, 40, 50, 60, 70, 80, 90, or 100 percent of the axial length 310 between the leading and trailing edges 300 and 302. In the illustrated embodiment, the axial range 412 of the fluid injectors 246 is disposed in a trailing edge portion 414 of the vane 120, which may include an area of the vane 120 between the trailing edge 302 and approximately 10, 20, or 30 percent of the axial length 310 of the vane 120. In operation, the varying axial distances 308 of the fluid injectors 246 over the axial range 412 may provide axial variations to facilitate the variable heat release or combustion positions 320 as discussed above with reference to FIGS. 2 and 3.

The vane 120 having the fluid injectors 246 disposed along the variable dashed line 410 of FIG. 7 may be used for one or more of the vanes 120 having the variable injection positions 296 as illustrated in FIG. 2. In some embodiments, the vane 120 having the fluid injectors 246 disposed along the variable dashed line 410 of FIG. 7 may be used for all of the vanes 120 of FIG. 3, such that each vane 120 has variations but the vanes 120 are the same throughout the circumferential arrangement 274. In certain embodiments, the fluid injectors 246 of FIG. 7 may vary or remain the same relative to one another along the variable dashed line 410. For example, the fluid injectors 246 may be the same or vary with respect to one another in terms of the cross-sectional area 382, the angle 314 of the injection axis or direction 312, the geometrical shape or geometry, the fluid flow rate, the type of fluid being injected, or any combination thereof.

FIG. 8 is a perspective view of an embodiment of the vane 120 of FIGS. 1-3, wherein the plurality of fluid injectors 246 are disposed at variable axial distances 308 from the leading edge 300 along a variable dashed line 420. The variable dashed line 420 of FIG. 8 may vary in a manner the same as or similar to the variable dashed line 410 of FIG. 7; however, the variable dashed line 420 is disposed upstream from the variable dashed line 410 of FIG. 7. For example, the variable dashed line 420 may alternatingly turn (e.g., curve) back and forth in opposite axial directions in a uniform (e.g., sinusoidal) or non-uniform (e.g., irregular) manner to define the variable axial distances 308 to the fuel injectors 246. In the illustrated embodiment, the variable dashed line 420 extends over an axial range 422 between the leading and trailing edges 300 and 302, wherein the axial range 422 may be equal to or greater than 10, 20, 30, 40, 50, 60, 70, 80, 90, or 100 percent of the axial length 310 between the leading and trailing edges 300 and 302. For example, the axial range 422 may be the same as the axial range 412 of FIG. 7, and the variable dashed line 420 may be the same shape as the variable dashed line 410 of FIG. 7. However, the axial range 422 and the variable dashed line 420 may differ from the embodiment of FIG. 7.

As discussed above with reference to FIG. 7, the vane 120 of FIG. 8 may be used for one or more of the vanes 120 having the variable injection positions 296 of FIG. 2, or the vane 120 of FIG. 8 may be used for all of the vanes 120 in the circumferential arrangement 274 of FIG. 3. In certain embodiments, the fluid injectors 246 of FIG. 8 may vary or remain the same relative to one another along the variable dashed line 420. For example, the fluid injectors 246 may be the same or vary with respect to one another in terms of the cross-sectional area 382, the angle 314 of the injection axis or direction 312, the geometrical shape or geometry, the fluid flow rate, the type of fluid being injected, or any combination thereof.

FIG. 9 is a perspective view of an embodiment of the vane 120 of FIGS. 1-3, wherein the plurality of fluid injectors 246 are disposed at variable axial distances 308 from the leading edge 300 along a variable dashed line 430. The variable dashed line 430 of FIG. 9 may vary in a manner the same as or similar to the variable dashed line 410 of FIG. 7 and/or the variable dashed line 420 of FIG. 8; however, the variable dashed line 430 is disposed upstream from the variable dashed lines 410 and 420 of FIGS. 7 and 8. For example, the variable dashed line 430 may alternatingly turn (e.g., curve) back and forth in opposite axial directions in a uniform (e.g., sinusoidal) or non-uniform (e.g., irregular) manner to define the variable axial distances 308 to the fuel injectors 246. The plurality of fluid injectors 246 are disposed along the variable dashed line 430 over an axial range 432, which may be equal to or greater than 10, 20, 30, 40, 50, 60, 70, 80, 90, or 100 percent of the axial length 310 between the leading and trailing edges 300 and 302. In the illustrated embodiment, the axial range 432 of the plurality of fluid injectors 246 is disposed at a leading edge portion 434 of the vane 120, wherein the leading edge portion 434 may extend between the leading edge 300 and approximately 10, 20, or 30 percent of the axial length 310.

The vane 120 of FIG. 9 may be used for one or more of the vanes 120 in the variable injection positions 296 of FIG. 2, or the vane 120 of FIG. 9 may be used for all of the vanes 120 in the circumferential arrangement 274. In certain embodiments, the fluid injectors 246 of FIG. 9 may vary or remain the same relative to one another along the variable dashed line 430. For example, the fluid injectors 246 may be the same or vary with respect to one another in terms of the cross-sectional area 382, the angle 314 of the injection axis or direction 312, the geometrical shape or geometry, the fluid flow rate, the type of fluid being injected, or any combination thereof.

FIGS. 10, 11, and 12 are perspective views of the vane 120 of FIGS. 1-3, wherein the plurality of fluid injectors 246 have different cross-sectional areas 382. For example, the cross-sectional areas 382 of the fluid injectors 246 of FIG. 10 are greater than the cross-sectional areas 382 of the fluid injectors 246 of FIGS. 11 and 12, and the cross-sectional areas 382 of the fluid injectors 246 of FIG. 11 are greater than the cross-sectional areas 382 of the fluid injectors 246 of FIG. 12. As illustrated in FIG. 10, the fluid injectors 246 are disposed at the axial distance 308 from the leading edge 300 as indicated by a dashed line 440, wherein the axial distance 308 may be constant or variable as discussed in detail above with reference to FIGS. 4-9. Similarly, the fluid injectors 246 of FIG. 11 are disposed at the axial distance 308 from the leading edge 300 as indicated by a dashed line 450, wherein the axial distance 308 may be constant or variable as discussed in detail above with reference to FIGS. 4-9. Finally, the fluid injectors 246 of FIG. 12 are disposed at the axial distance 308 from the leading edge 300 as indicated by a dashed line 460, wherein the axial distance 308 may be constant or variable as discussed above with reference to FIGS. 4-9.

In each of the vanes 120 of FIGS. 10, 11, and 12, the fluid injectors 246 may have common or varied geometrical shapes or geometries, such as circular geometries, oval geometries, square geometries, polygonal geometries, triangular geometries, or any combination thereof. Additionally, the fluid injectors 246 of FIGS. 10, 11, and 12 may have common or varied angles 314 of the fluid injection axis or direction 312, constant or variable flow rates, constant or variable types of fluids being injected, or any combination thereof. The vanes 120 of FIGS. 10, 11, and 12 may be used alone or in combination with one another in the variable injection system 270 of FIGS. 2 and 3.

In certain embodiments, the vanes 120 of FIGS. 4-12 may be used independently or in combination with one another for the vanes 120 in the turbine vane set 248. Additionally, the fuel injectors 246 may include any number and type of variations in the axial direction 30, the radial direction 32, and the circumferential direction 34, thereby helping to vary the heat release or combustion in the turbine blades 118 of the turbine blade sets 140 and 142 within the turbine stage expansion to provide isothermal expansion in the turbine stage 122 (e.g., common turbine stage 252). For example, the number of variations may be equal to or greater than 2, 3, 4, 5, 6, 7, 8, 9, 10, 15, 20, 25, 30, 40, 50, 75, 100, or more. The type of variations may include the axial distance 308, the cross-sectional area 382, the angle 314 of the injection axis or direction 312, the geometrical shape or geometry, the fluid flow rate, the type of fluid being injected, or any combination thereof. Additional details of the fluid injectors 246 also may be used in combination with the vanes 120 described in detail above with reference to FIGS. 1-12. For example, as discussed in detail below, each of the fluid injectors 246 may include one or more fluid injection ports in various arrangements, one or more angles 314 of the fluid injection axis or direction 312, one or more internal geometries to accelerate or direct the flow from the fluid injector 246, or any combination thereof.

FIG. 13 is a schematic of an embodiment of the isothermal expansion system 18 of FIGS. 1-12, further illustrating an embodiment of the fluid injector 246 as a multi-fluid injector 470. In the illustrated embodiment, the multi-fluid injector 470 has a body 472, which may be part of the vane body 370 of the vane 120 as discussed above, or the body 472 may be installed into a receptacle in the vane 120. The body 472 includes a fluid passage 474 disposed lengthwise along a central axis 476, a wall 478 disposed circumferentially about the fluid passage 474 and the central axis 476 and defining the fluid passage 474, a fluid passage 480 disposed circumferentially about the wall 478, a wall 482 disposed circumferentially about and defining the fluid passage 480, a fluid passage 484 disposed circumferentially about the wall 482, and a wall 486 disposed circumferentially about and defining the fluid passage 484. The walls 478, 482, 486 may be concentric annular walls disposed about the central axis 476, such that the fluid passage 474 is a cylindrical passage centered along the central axis 476, the fluid passage 480 is an annular passage concentric with the fluid passage 474, and the fluid passage 484 is an annular passage concentric with the fluid passages 480 and 474. In certain embodiments, the fluid passage 480 may include a plurality of circumferentially spaced passages about the central axis 476, the fluid passage 484 may include a plurality of circumferentially spaced passages disposed about the central axis 476, or a combination thereof. In general, the fluid passage 480 is disposed between and thus separates the fluid flows from the fluid passages 474 and 484.

The multi-fluid injector 470 is configured to inject an oxidant from the oxidant supply system 92, a barrier fluid from the fluid supply system 94, and a fuel from the fuel supply system 90. In certain embodiments, the isothermal expansion system 18 routes the oxidant, barrier fluid, and fuel to the respective fluid passages 484, 480, and 484 of the multi-fluid injector 470 via distribution through the distribution system 240 and the fluid manifold(s) 242 as discussed above. For example, the controller 220 may be configured to control the oxidant supply system 92, the fluid supply system 94, the fuel supply system 90, the distribution system 240, and the fluid manifold(s) 242 and various flow control components to regulate the fluid flow rates, pressures, directions of flow of the fluids, compositions of the fluids, or any combination thereof, into and through the multi-fluid injector 470 in one or more locations in each of the vanes 120.

In certain embodiments, the isothermal expansion system 18 may be configured to selectively change the routes of the oxidant flow, the barrier fluid flow, and the fuel flow to the different passages 474, 480, and 484 of the multi-fluid injector 470. For example, in some embodiments, the controller 220 may control the distribution system 240, the fluid manifold 242, and various flow control components (e.g., valves) to route the fuel flow through the fluid passage 474, the barrier fluid flow through the fluid passage 480, and the oxidant flow through the fluid passage 484, such that the barrier fluid flow is disposed between the fuel and oxidant flows. Similarly, the controller 220 may control the distribution system 240, the fluid manifold 242, and various flow control components to route the oxidant flow through the fluid passage 474, the barrier fluid flow through the fluid passage 480, and the fuel flow through the fluid passage 484, such that the barrier fluid flow is disposed between the oxidant and the fuel flows.

In either case, the barrier fluid flow is output by the multi-fluid injector 470 between the fuel and oxidant flows, thereby delaying mixing of the oxidant and fuel flows until an axial distance downstream of the multi-fluid injector 470. In certain embodiments, the isothermal expansion system 18 is configured to control the fluid flow rates of the oxidant, barrier fluid, and fuel, such that the barrier fluid delays mixing between the oxidant and fuel flows until a variable axial distance downstream from the multi-fluid injector 470 to help facilitate the variable heat release or combustion positions 320 as discussed in detail above with reference to FIGS. 2 and 3. Accordingly, the isothermal expansion system 18 may control the fluid flows (e.g., oxidant, barrier fluid, and fuel) differently through different multi-fluid injector 470 on the same or different vanes 120, thereby varying the axial distances to the heat release or combustion along the turbine blades 118 within the turbine stage expansion to help provide isothermal expansion through the turbine stage 122 (e.g., common turbine stage 252).

FIG. 14 is a cross-sectional view of the multi-fluid injector 470 of FIG. 13 taken along line 14-14, further illustrating a geometry of the fluid passages 474, 480, 484 and the walls 478, 482, and 486. As illustrated in FIG. 14, the walls 478, 482, and 486 are annular walls disposed in a concentric arrangement about the central axis 476. Similarly, the fluid passages 474, 480, and 484 are disposed in a concentric arrangement about the central axis 476, wherein the fluid passage 474 is a cylindrical passage, the fluid passage 480 is an annular passage disposed between annular walls 478 and 482, and the fluid passage 484 is an annular passage disposed between the annular walls 482 and 486.

In the illustrated embodiment, the fluid passage 474 may be configured to inject fuel from the fuel supply system 90, the fluid passage 480 may be configured to inject the barrier fluid from the fluid supply system 94, and the fluid passage 484 may be configured to inject oxidant from the oxidant supply system 92. However, in other embodiments the fluids may be rearranged through the fluid passages 474, 480, and 484. For example, the fluid passage 474 may be configured to inject the oxidant from the oxidant supply system 92, the fluid passage 480 may be configured to inject the barrier fluid from the fluid supply system 94, and the fluid passage 484 may be configured to inject the fuel from the fuel supply system 90. The oxidant may include oxygen, air, an oxygen reduced air, an oxygen enriched air, or any combination thereof. The barrier fluid may include an inert gas such as nitrogen, an exhaust gas (e.g., exhaust gas from stoichiometric combustion), an oxygen reduced air (e.g., exhaust gas from non-stoichiometric combustion), carbon dioxide or other captured gas from the carbon capture system 192, or another suitable fluid to block mixing and delay combustion of the fuel with the oxidant.

In the embodiment of FIGS. 13 and 14, the walls 478, 482, 486 terminate at a common axial position or plane 488 along the central axis 476. However, in certain embodiments, the walls 478, 482, and 486 may be axially staggered relative to one another along the central axis 476 to control the injection locations and delay mixing of the oxidant and fuel flows from the multi-fluid injector 470. Again, the multi-fluid injector 470 may be used in each of the fluid injectors 246 in the vanes 120, thereby helping to control the variable heat release for combustion positions 320 in the turbine blade sets 140 and 142 of the circumferential arrangements 278 and 282 of blades 118.

FIG. 15 is a cross-sectional view of an embodiment of one of the fluid injectors 246 of FIGS. 1-12, further illustrating a fluid passage 500 having a converging-diverging passage geometry 502. The fluid passage 530 may be a fuel passage, an oxidant passage, or a barrier fluid passage. As illustrated, the fluid passage 500 is disposed in a body 504, which may be part of the vane body 370 of the vane 120 as discussed above. However, the body 504 may be fixedly or removably mounted in a receptacle in the vane 120. The fluid passage 500 extends through the body 504 from an inlet 506 to an outlet 508 in a flow direction 510 along an axis 512. In the illustrated embodiment, the converging-diverging passage geometry 502 of the fluid passage 500 includes a converging passage 514 disposed at the inlet 506, a diverging passage 516 disposed at the outlet 508, and a throat 518 between the converging and diverging passages 514 and 516. The converging-diverging passage geometry 502 may be symmetric about the axis 512. For example, the converging passage 514 may include an annular converging passage that converges toward the axis 512 along a linear or curved profile 518, while the diverging passage 516 may be an annular diverging passage that diverges away from the axis 512 along a linear or curved profile 520 (e.g., inner annular surface profile). For example, the profiles 518 and 520 may be defined by conical surfaces and/or curved annular surfaces. The throat 518 may be a circular or cylindrical throat defining a minimum cross-sectional area along the converging-diverging passage geometry 502.

In certain embodiments, the converging passage 514 is configured to accelerate the fluid flow along the flow direction 510 toward the outlet 508 of the fluid injector 246. The particular geometry of the converging passage 514, the diverging passage 516, and the throat 518 may be used to control the acceleration of the fluid flow in the downstream direction to facilitate the variable heat release or combustion positions 320 as discussed above with reference to FIGS. 2 and 3. For example, the cross-sectional areas of the fluid passage 500 (e.g., inlet 506, the outlet 508, and the throat 518), the ratios of the cross-sectional areas, and other characteristics of the fluid passage 500 may vary from one fluid injector 246 to another to help vary the heat release or combustion positions 320 within the turbine stage expansion, thereby helping to provide isothermal expansion across the blades 118 in the turbine stage 122 (e.g., common turbine stage 252).

FIG. 16 is a cross-sectional view of an embodiment of one of the fluid injectors 246 of FIGS. 1-12, further illustrating a fluid passage 530 having a converging passage geometry 532. The fluid passage 530 may be a fuel passage, an oxidant passage, a barrier fluid passage, or fluid mixture passage (e.g., fuel-air mixture passage). As illustrated, the fluid passage 530 has the converging passage geometry 532 extending from an inlet 534 to an outlet 536 in a flow direction 538 along an axis 540. The converging passage geometry 532 may include an annular converging passage geometry, wherein the converging passage geometry 532 gradually converges toward the axis 540 in a linear manner or curved manner as indicated by a profile 542 (e.g., inner annular surface profile). In certain embodiments, the linear profile 542 may include one or more angles relative to the axis 540, thereby gradually converging the fluid flow in the flow direction 510 toward the outlet 536. The converging passage geometry 532, similar to the embodiment of FIG. 15, may be configured to accelerate the fluid flow in the flow direction 538 toward the turbine blades 118 to provide the variable heat release or combustion positions 320 as discussed in detail above with reference to FIGS. 2 and 3. For example, the cross-sectional areas of the fluid passage 530 (e.g., inlet 534, the outlet 536, and intermediate positions), the ratios of the cross-sectional areas, and other characteristics of the fluid passage 530 may vary from one fluid injector 246 to another to help vary the heat release or combustion positions 320 within the turbine stage expansion, thereby helping to provide isothermal expansion across the blades 118 in the turbine stage 122 (e.g., common turbine stage 252).

FIG. 17 is cross-sectional view of the multi-fluid injector 470 of FIGS. 13 and 14, further illustrating converging passage geometries 550, 552, and 554 in the fluid passages 474, 480, 484, respectively. In particular, the fluid passage 474 has the converging passage geometry 550 configured to converge toward the central axis 476 in a flow direction 556, the passage 480 has the converging passage geometry 552 to converge the passage in the flow direction 556, and the passage 484 has the converging passage geometry 554 configured to converge the passage in the flow direction 556. Thus, the passage 474 may be a conical shaped flow passage converging from an inlet 558 to an outlet 560, the passage 480 may be a converging annular flow passage extending from an inlet 562 to and outlet 564, and the passage 484 may be a converging annular passage extending from an inlet 566 to an outlet 568. Again, similar to the embodiment of FIGS. 13 and 14, the outlets 560, 564, and 568 may be disposed along the common axial position or plane 488, or the outlets 560, 564, 568 may be axially staggered relative to one another via axial staggering of the walls 478, 482, and 486. The illustrated multi-fluid injector 470 may be used for one or more of the fluid injectors 246 on the vanes 120 alone or in combination with the multi-fluid injector 470 of FIGS. 13 and 14, the converging-diverging passage geometry 502 of FIG. 15, the converging passage geometry 532 of FIG. 16, or the additional passage geometries discussed in further detail below, thereby helping to provide the variable heat release or combustion positions 320 and isothermal expansion across the blades 118 in the turbine stage 122 (e.g., common turbine stage 252).

FIG. 18 is a cross-sectional view of an embodiment of the fluid injector 246 of FIGS. 1-17, further illustrating the angle 314 of the fluid injection axis or direction 312 being approximately 90 degrees relative to a surface 580 at an outlet 582 of a fluid passage 584 through a body 586. The body 586 may be part of the vane body 370 of the vane 120 as discussed in detail above. However, in certain embodiments, the body 586 may be fixedly or removably coupled to the vane 120 via a receptacle in the vane body 370. The fluid passage 584 extends through the body 586 from an inlet 588 to the outlet 582. The fluid passage 584 is generally aligned or coaxial with an axis 590 extending through the body 586, wherein the axis 590 and the fluid injection axis or direction 312 are disposed at the angle 314 relative to the surface 580, which may correspond to the surface along the vane 120. As discussed in detail above, the angle 314 may be the same or varied between the different fluid injectors 246 on each vane 120 or between different vanes 120 in the circumferential arrangement 274 of vanes 120 in the turbine vane set 248. Accordingly, although the angle 314 of FIG. 18 is approximately 90 degrees, the angle 314 may vary in other fluid injectors 246. The variable angles 314 between the fluid injectors 246 and/or the vanes 120 may be configured to help vary the heat release or combustion positions 320 within the turbine stage expansion, thereby helping to provide isothermal expansion across the blades 118 in the turbine stage 122 (e.g., common turbine stage 252).

FIG. 19 is a cross-sectional view of an embodiment of the fluid injector 246 of FIGS. 1-17, further illustrating the angle 314 of the fluid injection axis or direction 312 as an acute angle relative to a surface 598 of a body 600. In the illustrated embodiment, the fluid injector 246 has a fluid passage 602 extending through the body 600 from an inlet 604 to an outlet 606 at the surface 580, wherein the body 600 may be part of the vane body 370 or mounted in a receptacle of the vane body 370 as discussed above. The fluid passage 602 may include a passage 608 followed by a passage 610, wherein the passage 608 extends from the inlet 604 to the passage 610, and the passage 610 extends to the outlet 606. The passage 608 may be approximately perpendicular to the surface 580, while the passage 610 may be oriented at the angle 314 as the fluid injection axis or direction 312 extends at an angle relative to the surface 580 (e.g., relative to a line tangent to the surface 580 at the outlet 606). For example, the angle 314 may be between 0 to 90, 10 to 80, 20 to 70, 30 to 60, or 40 to 60 degrees. In the illustrated embodiment, the angle 314 is an acute angle. The fluid injector 246 having the angle 314 of the passage 610 leading to the outlet 606 may be used for one or more of the fluid injectors 246 on one or more of the vanes 120 as discussed in detail above.

FIG. 20 is a cross-sectional view of an embodiment of the fluid injector 246 of FIGS. 1-17, further illustrating the angle 314 of the fluid injection axis or direction 312 as an acute angle relative to a surface 620 of a body 622. The fluid injector 246 includes a fluid passage 624 extending through the body 622 from an inlet 626 to an outlet 628 along the surface 620, wherein the fluid passage 624 includes a passage 630 followed by passages 632 and 634. The passage 630 extends from the inlet 626 to the passage 632, the passage 632 extends from the passage 630 to the passage 634, and the passage 634 extends from the passage 632 to the outlet 628. Each of the passages 630, 632, and 634 may have a constant cross-sectional area or a variable cross-sectional area along the axis 590. For example, one or more of the passages 630, 632, or 634 may include a converging passage or a diverging passage, such as discussed above with reference to FIGS. 15-17. In the illustrated embodiment, the passage 634 includes a converging passage (e.g., conical passage) that converges in the flow direction to the outlet 628.

The passages 630, 632, and 634 may gradually change angles until reaching the surface 620, thereby defining the angle 314 of the fluid injection axis or direction 312. In the illustrated embodiment, the angle 314 may be less than or equal to 5, 10, 15, 20, 25, or 30 degrees relative to the surface 620 (e.g., relative to a line tangent to the surface 620 at the outlet 628). Additionally, the angle 314 of the fluid injector 246 of FIG. 20 is less than the angle 314 of the fluid injectors 246 of FIGS. 18 and 19, while the angle 314 of the fluid injector 246 of FIG. 19 is less than the angle 314 of the fluid injector 246 of FIG. 18. Accordingly, various angles 314 may be used for the fluid injectors 246 on each of the vanes 120 and/or from one vane 120 to another in the circumferential arrangement 274 of vanes 120 in the turbine vane set 248. In certain embodiments, the fluid injectors 246 having variable angles 314 as shown in FIGS. 18-20 (including any number of different angles 314) may be used in combination with the various fluid injector 246 features described herein. As discussed above, the variable angles 314 of the fluid injectors 246 may be configured to help control or vary the heat release or combustion positions 320 along the blades 118 in the turbine blade sets 140 and 142 within the turbine stage expansion, thereby helping to provide isothermal expansion across the blades 118 in the turbine stage 122 (e.g., common turbine stage 252).

FIGS. 21-26 are perspective view of embodiments of the blades 118 of FIGS. 1-3, further illustrating details of the flame stabilizers 250 of the variable stabilizer system 272. The flame stabilizers 250 include structural features configured to help hold and/or stabilize a flame (and thus heat release from combustion) in a particular position (e.g., axial position and radial position) along the turbine blades 118. Before addressing each embodiment of FIGS. 21-26, various aspects of the blades 118 are discussed below. As illustrated, the blade 118 includes a blade body 650 extending from a base 652 in the radial direction 32 to a tip 654. The blade body 650 has a cross-sectional area 656, which may be constant or variable in the radial direction 32 from the base 652 to the tip 654. For example, in certain embodiments, the cross-sectional area 656 gradually decreases in the radial direction 32 from the base 652 to the tip 654. The blade body 650 is further defined by the leading edge 326, the trailing edge 328, the pressure side 330, and the suction side 332. The cross-sectional area 656 is bounded by the pressure and suction sides 330 and 332 and may define an airfoil shaped geometry. As discussed above, the blade 118 has an axial length 336 extending from the leading edge 326 to the trailing edge 328. The axial length 336 may vary from the base 652 to the tip 654 depending on whether the cross-sectional area 656 is constant or variable from the base 652 to the tip 654.

The variable stabilizer system 272 has the flame stabilizers 250 disposed at one or more locations along the blade 118, such as arranged in the radial direction 32 and the axial direction 30, along the pressure side 330 between the leading edge 326 and the trailing edge 328. Each flame stabilizer 250 may include one or more protrusions 660 and/or recesses 662, which are positioned in separate or overlapping positions relative to one another. For example, in the illustrated embodiment, each flame stabilizer 250 may include a protrusion 660 disposed in a recess 662 along a surface 664 of the blade body 650, such as the pressure side 330. The protrusion 660 and the recess 662 may have a variety of shapes and dimensions in axial direction 30, the radial direction 32, and the circumferential direction 34. In the illustrated embodiment, the recess 662 has an elongated oval geometry 666 and the protrusion 660 has a curved or C-shaped geometry 668. However, as discussed in further detail below, the geometries of the protrusions 660 and the recesses 662 may vary between the flame stabilizers 250 on each blade 118 and between different blades 118. Additionally, the variable stabilizer system 272 has the flame stabilizers 250 disposed at various positions along the blades 118 as illustrated in FIGS. 21-26 to facilitate the variable heat release or combustion positions 320 and isothermal expansion as discussed above with reference to FIGS. 2 and 3. The differences between the embodiments of FIGS. 21-26 will now be discussed in further detail below.

FIG. 21 is a perspective view of an embodiment of the blade 118 of FIGS. 1-3, further illustrating details of the variable stabilizer system 272 having the flame stabilizers 250 disposed at a constant axial distance 334 from the leading edge 326 as indicated by dashed line 670. The dashed line 670 generally extends in the radial direction 32 parallel to the leading edge 326, such that each of the flame stabilizers 250 is disposed at the same axial distance 334 from the leading edge 326. The flame stabilizers 250 may have the same geometry or different geometries of the protrusion 660 and the recess 662 in various embodiments. In the illustrated embodiment, the variable stabilizer system 272 includes a plurality of the flame stabilizers 250 at different radial distances 672 from the base 652 in the radial direction 32. For example, the radial distances 672 may range between 0 to 100, 10 to 90, 20 to 80, 30 to 70, and 40 to 60 percent, or any other suitable range or percentage of a total radial length 674 of the blade 118 from the base 652 to the tip 654.

The flame stabilizers 250 may be spaced either uniformly or non-uniformly relative to one another in the radial direction 32. In the embodiment of FIG. 21, the axial distance 334 may be measured between the leading edge 326 and a center of the flame stabilizers 250 as indicated by the dashed line 670. Accordingly, the axial distance 334 may be between 0 to 50, 0 to 40, 0 to 30, 0 to 20, and 0 to 10 percent of the axial length 336 between the leading and trailing edges 326 and 328. For example, the flame stabilizers 250 along the dashed line 670 may be disposed in a leading edge portion 676 of the blade 118, which may correspond to a portion of the blade 118 between the leading edge 326 and about 10, 20, or 30 percent of the axial length 336.

FIG. 22 is a perspective view of an embodiment of the blade 118 of FIGS. 1-3, further illustrating details of the variable stabilizer system 272 having the flame stabilizers 250 disposed at a common axial distance 334 from the leading edge 326 as indicated by a dashed line 690. In the illustrated embodiment, the flame stabilizers 250 may have substantially the same characteristics as discussed above with reference to FIG. 21; however, the axial distance 334 along the dashed line 690 is further downstream from the leading edge 326 as compared to FIG. 21. In the illustrated embodiment, the axial distance 334 along the dashed line 690 may be between 20 to 80, 30 to 70, 40 to 60, or about 50 percent of the axial length 336 between the leading and trailing edges 326 and 328. Again, the flame stabilizers 250 may have the same or different geometries for the protrusions 660 and recesses 662. The flame stabilizers 250 may be disposed at similar radial distances 672 in the radial direction 32 as discussed above with reference to FIG. 21. However, in certain embodiments, the radial distances 672 of the flame stabilizers 250 may differ from those of the flame stabilizers 250 of FIG. 21.

FIG. 23 is perspective view of an embodiment of the blade 118 of FIGS. 1-3, further illustrating details of the variable stabilizer system 272 having flame stabilizers 250 disposed at a constant axial distance 334 from the leading edge 326 as indicated by a dashed line 700. In the illustrated embodiment, the flame stabilizers 250 may have substantially the same characteristics as discussed above with reference to FIG. 21; however, the axial distance 334 along the dashed line 700 is further downstream from the leading edge 326 as compared to FIGS. 21 and 22. For example, in the embodiment of FIG. 23, the flame stabilizers 250 along the dashed line 700 may be disposed along a trailing edge portion 702 of the blade 118, wherein the trailing edge portion 702 may be disposed between the trailing edge 328 and about 10, 20, or 30 percent of the axial length 336 from the trailing edge 328. In certain embodiments, the axial distance 334 may be between about 50 to 100, 60 to 100, 70 to 100, 80 to 100, or 90 to 100 percent of the axial length 336 of the blade 118. Similar to the embodiments of FIGS. 21 and 22, the dashed line 700 extends in the radial direction 332, wherein the flame stabilizers 250 may be disposed at different radial distances 672 along the radial length 674 of the blade 118. The radial distances 672 may be the same or different from the radial distances 672 of the flame stabilizers 250 as shown in FIGS. 21 and 22.

The flame stabilizers 250 with the constant axial distances 334 along the dashed lines 670, 690, and 700 of FIGS. 21, 22, and 23 may be used individually or in combination with one another for the blades 118 in the circumferential arrangements 278 and 282 of FIGS. 2 and 3. The flame stabilizers 250 also may be disposed in other arrangements in combination with those shown in FIGS. 21, 22, and 23. Additionally, the flame stabilizers 250 may be coupled to the blades 118 at any number of axial and radial positions, such as at least 2, 3, 4, 5, 6, 7, 8, 9, 10, 20, 30, 40, 50, 100, 200, or more axial and radial positions. The different positions of the flame stabilizers 250 help to vary the heat release or combustion positions 320 along the blades 118 in the turbine blade sets 140 and 142 within the turbine stage expansion, thereby helping to provide isothermal expansion across the blades 118 in the turbine stage 122 (e.g., common turbine stage 252).

FIGS. 24, 25, and 26 are perspective views of embodiments of the blade 118 with variable axial distances 334 from the leading edge 326 to the flame stabilizers 250, wherein each successive embodiment shows the flame stabilizers 250 offset further away from the leading edge 326. For example, FIG. 24 is a perspective view of the blade 118 of FIGS. 1-3, illustrating the variable stabilizer system 272 having the flame stabilizers 250 disposed at the variable axial distance 334 as indicated by a variable dashed line 710. The variable dashed line 710 generally extends in the radial direction 32 while varying in the axial direction 30. Accordingly, the axial distance 334 from the leading edge 326 to the flame stabilizers 250 vary from one flame stabilizer 250 to another along the variable dashed line 710. In the illustrated embodiment, the flame stabilizers 250 with the variable axial distance 334 are generally disposed in the leading edge portion 676 of the blade 118. For example, the flame stabilizers 250 may be positioned along (e.g., centered along) the variable dashed line 710 over an axial range 712 of approximately 5 to 100, 10 to 90, 20 to 80, 30 to 70, or 40 to 60 percent of the axial length 336 between the leading and trailing edges 326 and 328.

The variable dashed line 710 may include one or more of a curving line, a zig-zagging or wavy line, an angled line, or any combination thereof, wherein the variable dashed line 710 indicates (or follows) changes in the axial distance 334 relative to the leading edge 326. For example, the variable dashed line 710 may alternatingly turn (e.g., curve) back and forth in opposite axial directions in a uniform (e.g., sinusoidal) or non-uniform (e.g., irregular) manner to define the variable axial distances 334 to the flame stabilizers 250. Accordingly, the variable axial distances 334 of the flame stabilizers 250 may be disposed anywhere between the leading and trailing edges 326 and 328. However, in the illustrated embodiment, the flame stabilizers 250 along the variable dashed line 710 are generally disposed in the leading edge portion 676.

FIG. 25 is perspective view of an embodiment of the blade 118 of FIGS. 1-3, further illustrating details of the variable stabilizer system 272 having the flame stabilizers 250 disposed at the variable axial distance 334 as indicated by a variable dashed line 720. The variable dashed line 720 of FIG. 25 may vary in a manner the same as or similar to the variable dashed line 710 of FIG. 24; however, the variable dashed line 720 is disposed downstream from the variable dashed line 710 of FIG. 24. For example, the variable dashed line 720 may alternatingly turn (e.g., curve) back and forth in opposite axial directions in a uniform (e.g., sinusoidal) or non-uniform (e.g., irregular) manner to define the variable axial distances 334 to the flame stabilizers 250. Additionally, the flame stabilizers 250 may be positioned along (e.g., centered along) the variable dashed line 720 over an axial range 722, which may be at least approximately 5 to 100, 10 to 90, 20 to 80, 30 to 70, or 40 to 60 percent of the axial length 336 between the leading and trailing edges 326 and 328. In the illustrated embodiment, the flame stabilizers 250 are disposed along the variable dashed line 720 at an intermediate region generally midway between the leading and trailing edges 326 and 328.

FIG. 26 is a perspective view of an embodiment of the blade 118 of FIGS. 1-3, further illustrating details of the variable stabilizer system 272 having the flame stabilizers 250 disposed at the variable axial distance 334 as indicated by a variable dashed line 730. The variable dashed line 730 of FIG. 26 may vary in a manner the same as or similar to the variable dashed lines 710 and 720 of FIGS. 24 and 25; however, the variable dashed line 730 is disposed downstream from the variable dashed lines 710 and 720 of FIGS. 24 and 25. For example, the variable dashed line 730 may alternatingly turn (e.g., curve) back and forth in opposite axial directions in a uniform (e.g., sinusoidal) or non-uniform (e.g., irregular) manner to define the variable axial distances 334 to the flame stabilizers 250. The flame stabilizers 250 may be positioned along (e.g., centered along) the variable dashed line 730 over an axial range 732, which may be at least approximately 5 to 100, 10 to 90, 20 to 80, 30 to 70, or 40 to 60 percent of the axial length 336 between the leading and trailing edges 326 and 328. In the illustrated embodiment, the flame stabilizers 250 along the dashed line 730 are generally disposed in the trailing edge portion 702 of the blade 118, such that the flame stabilizers 250 may be between the trailing edge 328 and about 10, 20, or 30 percent of the axial length 336.

As illustrated in FIGS. 24, 25, and 26, the flame stabilizers 250 may have the same geometry and configuration in each of the blades 118 and locations. However, in certain embodiments, the flame stabilizers 250 may be constant or variable from one flame stabilizer 250 to another and one blade 118 to another in terms of geometry, angle, spacing, or any combination thereof. The variable stabilizer system 272 may have flame stabilizers 250 in any of the arrangements shown in FIGS. 21-26 used alone or in combination with one another for the blades 118 in the circumferential arrangements 278 and 282 of FIGS. 2 and 3. The variations in positioning and arrangements of the flame stabilizers 250 are configured to help provide the variable heat release or combustion positions 320, which in turn helps to provide isothermal expansion across the blades 118 in the turbine stage 122 (e.g., common turbine stage 252). In embodiments with two turbine blade sets 140, 142, the flame stabilizers in the first blade set 140 may be the same as or different from the flame stabilizers in the second blade set 142.

As discussed above, the flame stabilizers 250 may be used alone or in combination with various aspects of the variable injection system 270, which may include variable injection positions 296 of FIG. 2, constant injection positions 350 of FIG. 3, variations in geometry, flow rates, angles 314, multi-fluid injectors 470, or any combination thereof. Each of the features of the variable injection system 270 and the variable stabilizer system 272 is configured to help provide isothermal expansion across the blades 118 in the turbine stage 122 (e.g., common turbine stage 252). FIGS. 27-32 illustrate embodiments of the flame stabilizers 250, which may be used in any combination with the variable injection system 270 and the variable stabilizer system 272 as discussed in detail above.

FIG. 27 is a top view of an embodiment of the flame stabilizer 250 of FIGS. 1-3 and 21-26, further illustrating details of the protrusions 660 disposed in the recess 662 on the surface 664 of the blade 118. As illustrated, the recess 662 has the elongated or oval geometry 666, while the protrusion 660 has the curved or C-shaped geometry 668. The protrusion 660 may be disposed at any location within the recess 662, thereby helping to maintain a low profile of the protrusion along the surface 664 of the blade 118. The blade 118 has the flame stabilizer 250 oriented along a flow direction 750, such that the fluid flow in the flow direction 750 partially extends across the recess 662 before reaching the protrusion 660. In operation, the fluid flow in the flow direction 750 enters the recess 662 and impacts the protrusion 660, which creates a low velocity zone to help stabilize or hold a flame at a position along the blade 118 and thus controls positioning (e.g., axial position and radial position) of heat release from combustion along the blade 118.

The recess 662 has the elongated or oval geometry 666, which may include an upstream edge 752, a downstream edge 754, and opposite sides 756 and 758 extending from the upstream edge 752 to the downstream edge 754. The recess 662 also may have a constant or variable depth between the upstream edge 752 and the downstream edge 754 and between the opposite sides 758. The protrusion 660 may be disposed at a variable or constant distance 760 relative to the upstream edge 752. For example, the distance 760 may be any percentage of an axial length 762 of the recess 662 between the upstream and downstream edges 752 and 754. For example, the distance 760 may range between 0 to 100, 0 to 80, 0 to 60, 0 to 40, 0 to 20, 20 to 80, 30 to 70, or 40 to 60 percent of the axial length 762, or any other suitable percentage of the axial length 762. The distance 760 may be varied to control the flame stabilization provided by the flame stabilizer 750.

The protrusion 660 has the curved or C-shaped geometry 668, which may include a rear wall 764 connected to opposite sidewalls 766 and 768. The rear wall 764 and sidewalls 766 and 768 are disposed around a space 770, while the protrusion 760 has an opening 772 into the space 770 between the opposite sidewalls 766 and 768. The opening 772 and the space 770 face in the upstream direction opposite the flow direction 750, such that the fluid flow is directed into the opening 772 and the space 770. The rear wall 764 may be a flat or curved wall, while the sidewalls 766 and 768 may angled, straight, or curved about the space 770. The protrusion 660 also may provide or define a low velocity zone 774 behind or downstream from the rear wall 764 in the flow direction 750, thereby facilitating flame stabilization of a flame formed adjacent the flame stabilizer 250.

The geometry, dimensions, and positioning of the recess 662 and the protrusion 660 may facilitate or adjust the position of the flame stabilization provided by the flame stabilizer 250. In certain embodiments, the recess 662 and the protrusion 660 of the flame stabilizer 250 of FIG. 27 may have the same geometry and dimensions while varying in positioning across multiple flame stabilizers 250 on a particular blade 118 or between different blades 118 in the circumferential arrangements 278 and 282 of the turbine blade sets 140 and 142. However, the geometry and/or dimensions also may vary between different flame stabilizers 250 on the same or different blades 118 with or without variations in the positioning. In certain embodiments, the geometry, dimensions, and positioning of the recess 662 and the protrusion 660 may vary between different flame stabilizers 250 on a particular blade 118 or between different blades 118.

FIG. 28 is a cross-sectional view of an embodiment of the flame stabilizer 250 of FIG. 27, further illustrating details of the protrusion 660 and the recess 662. As illustrated in FIG. 28, the recess 664 has a base or bottom surface 790 with a variable depth 792 between the upstream and downstream edges 752 and 754. In particular, the base or bottom surface 790 may curve to variable depths 792 between the upstream and downstream edges 752 and 754. The protrusion 660 is disposed in the recess 662 along the base or bottom surface 790, wherein the protrusion 760 extends outwardly to a height 794 relative to the base or bottom surface 790. The height 794 may be equal to the depth 792 of the recess 662 at the location of the protrusion 660, or the height 794 may be disposed at a lower height 796 or a greater height 798 relative to a line or contour 800 level with the surface 664 surrounding the recess 662. Accordingly, in certain embodiments, the flame stabilizer 250 may have a variable depth 792, a variable height 794, a variable distance 760, other varying dimensions and geometries, or any combination thereof, from one flame stabilizer 250 to another, thereby varying the positioning of the flame stabilization by the flame stabilizers 250 to help distribute the heat release of combustion and provide isothermal expansion across the blades 118.

FIG. 29 is a top view of an embodiment of the flame stabilizer 250 of FIGS. 1-3 and 21-26, further illustrating details of the protrusions 660 disposed in the recess 662 on the surface 664 of the blade 118. The flame stabilizer 250 is substantially the same as discussed above with reference to FIGS. 27 and 28, wherein one or more features of the flame stabilizer 250 are variable to help provide isothermal expansion across the blades 118. However, the curved or C-shaped geometry 668 of FIG. 29 differs from the embodiment of FIGS. 27 and 28. The curved or C-shaped geometry 668 of the protrusion 660 in the embodiment of FIG. 29 has a curved or arcuate wall 810 extending at least partially about a space 812. For example, the C-shaped geometry 668 may exclude any flat or linear walls, such that the protrusion 660 is defined at least substantially or entirely by the curved or arcuate wall 810. The curved or arcuate wall 810 has an opening 814 into the space 812, wherein the opening 814 and the space 812 face in the upstream direction opposite the flow direction 750. Downstream from the curved or arcuate wall 810, the flame stabilizer 250 has the low velocity zone 774 configured to facilitate flame stabilization and heat release in a desired location for isothermal expansion in the turbine blade sets 140 and 142. Other aspects of the flame stabilizer 250 are as described in detail above.

FIG. 30 is a cross-sectional view of an embodiment of the flame stabilizer 250 of FIG. 29, further illustrating the curved or arcuate wall 810 of the protrusion 660 disposed in the recess 662. The recess 662 is substantially the same as discussed above with reference to FIGS. 27 and 28, including the variable depth 792 of the base or bottom surface 790 and the variable height 794 of the protrusion 660. For example, the curved or arcuate wall 810 of the protrusion 660 may be disposed at the height 794 flush or even with the line or contour 800 of the surface 664, or the curved or arcuate wall 810 may be disposed at the lower height 796 or the greater height 798 relative to the line or contour 800. Accordingly, in certain embodiments, the flame stabilizer 250 may have a variable depth 792, a variable height 794, a variable distance 760, a variable radius of curvature of the curved or arcuate wall 810, other varying dimensions and geometries, or any combination thereof, from one flame stabilizer 250 to another, thereby varying the positioning of the flame stabilization by the flame stabilizers 250 to help distribute the heat release of combustion and provide isothermal expansion across the blades 118.

FIG. 31 is top view of an embodiment of the flame stabilizer 250 of FIGS. 1-3 and 21-26, further illustrating details of the protrusion 660 disposed in the recess 662 on the surface 664 of the blade 118. The flame stabilizer 250 is substantially the same as discussed above with reference to FIGS. 27-30, wherein one or more features of the flame stabilizer 250 are variable to help provide isothermal expansion across the blades 118. However, the protrusion 660 of the embodiment of FIG. 31 includes a rectangular geometry 820, whereas the protrusion 660 of the embodiments of FIGS. 27-30 include different curved or C-shaped geometries 668. As illustrated, the rectangular geometry 820 of the protrusion 660 includes an upstream flat wall 822, a downstream flat wall 824, and opposite flat sidewalls 826 and 828. The upstream flat wall 822 faces in an upstream direction opposite from the flow direction 750, whereas the downstream flat wall 824 faces in a downstream direction toward the low velocity zone 774. A ratio of dimensions of the flat walls 822 and 824 relative to the sidewalls 826 and 828 may vary depending on dimensions of the recess 662 and a desired width of the low velocity zone 774. Again, similar to the embodiments discussed above, the distance 760 from the upstream edge 752 to the rectangular geometry 820 of the protrusion 660 may vary from one flame stabilizer 250 to another on a particular blade 118 or between different blades 118.

FIG. 32 is a cross-sectional view of an embodiment of the flame stabilizer 250 of FIG. 31, further illustrating details of the rectangular geometry 820 of the protrusion 660 disposed in the recess 662. The recess 662 is substantially the same as discussed in detail above with reference to FIGS. 27 and 28, including the variable depth 792 of the base or bottom surface 790 and the variable height 794 of the protrusion 660. For example, the recess 662 may include the variable depth 790 to the base or bottom surface 790. Additionally, the protrusion 660 having the rectangular geometry 820 may have the variable height 794 between the base or bottom surface 790 and the line or contour 800, such that the height 794 may be even or equal to the line or contour 800, or the protrusion 660 may have the lower height 796 or the greater height 798 relative to the line or contour 800. The distance 760 between the upstream edge 752 and the protrusion 760 also may vary as discussed above. Accordingly, in certain embodiments, the flame stabilizer 250 may have a variable depth 792, a variable height 794, a variable distance 760, a variable width or length/width ratio of the rectangular geometry 820, other varying dimensions and geometries, or any combination thereof, from one flame stabilizer 250 to another, thereby varying the positioning of the flame stabilization by the flame stabilizers 250 to help distribute the heat release of combustion and provide isothermal expansion across the blades 118.

The flame stabilizers 250 of FIGS. 27-32 are examples of different flame stabilizers 250 that may be used alone or in combination with one another in the variable stabilizer system 272 in each of the blades 118 and/or from one blade 118 to another. Accordingly, the flame stabilizers 250 may be coupled to the various blades 118 having different geometries, different dimensions, different positioning (e.g., axial and radial positions), or any combination thereof, thereby varying the axial distances to the heat release or combustion along the turbine blades 118 within the turbine stage expansion to help provide isothermal expansion through the turbine stage 122 (e.g., common turbine stage 252). The flame stabilizers 250 of the variable stabilizer system 272 may be used in any combination with features of the variable injection system 270 as discussed in detail above.

Figure 33:
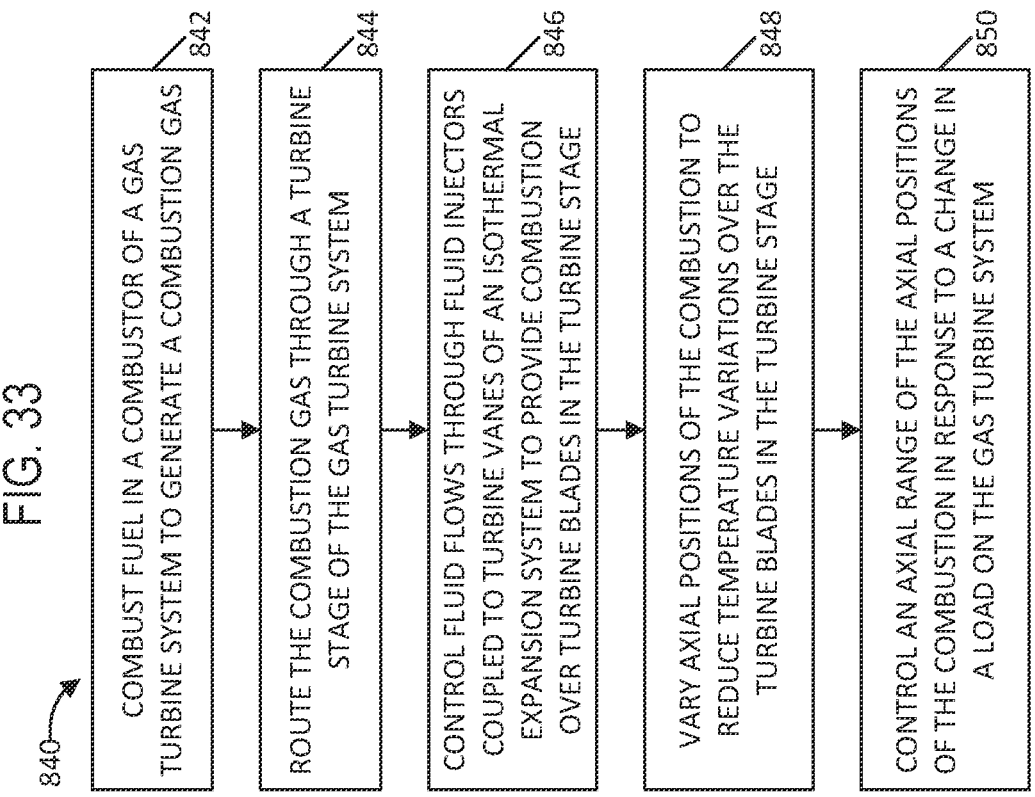
FIG. 33 is a flow chart of an embodiment of a process for operating the gas turbine system with the variable injection system of the isothermal expansion system 18 of FIGS. 1-32.

FIG. 33 is a flow chart of an embodiment of a process 840 for operating the gas turbine system 12 with the variable injection system 270 of the isothermal expansion system 18 of FIGS. 1-32, wherein the process 840 includes control via the controller 220. In the illustrated embodiment, the process 840 includes combusting fuel in a combustor 62 of a gas turbine system 12 to generate a combustion gas 112 (block 842). The process 840 also includes routing the combustion gas 112 through a turbine stage 252 of the turbine section 46 of the gas turbine system 12 (block 844). The process 840 also includes controlling fluid flows through fluid injectors 246 coupled to turbine vanes 120 of the isothermal expansion system 18 to provide combustion over turbine blades in the turbine stage 252 (block 846). The process 840 also includes varying axial positions of the combustion within the turbine stage expansion to reduce temperature variations over the turbine blades 118 in the turbine stage 252 (block 848). The process 840 also includes controlling an axial range of the axial positions of the combustion in response to a change in a load on the gas turbine system 12 (block 850). The varying axial positions (block 848) and the controlled axial range (block 850) may be achieved via control of the variable injection system 270 using the controller 220 as discussed in detail above with reference to FIGS. 2 and 3, wherein the fluid injectors 246 may be disposed at the variable injection positions 296 of FIG. 2 or the constant injection positions 350 of FIG. 3.

As illustrated below, Table 1 illustrates a control scheme for the isothermal expansion system 18 using the fluid injectors 246 of the variable injection system 270.

TABLE 1

| Fluid Injectors Coupled to Turbine Vanes | | | Turbine Blades Axial Combustion |
|---|---|---|---|
| Fluid Injector | Axial Position | Fluid Flow Rate | Position |
| I0 | P0 | R0 | CP0 |
| I1 | P1 | R1 | CP1 |
| I2 | P2 | R2 | CP2 |
| I3 | P3 | R3 | CP3 |
| I4 | P4 | R4 | CP4 |
| I5 | P5 | R5 | CP5 |
| I6 | P6 | R6 | CP6 |
| I7 | P7 | R7 | CP7 |
| I8 | P8 | R8 | CP8 |
| I9 | P9 | R9 | CP9 |
| I10 | P10 | R10 | CP10 |

As illustrated above, the control scheme may include a plurality of fluid injectors 246, or groups of multiple fluid injectors 246, as indicated by fluid injectors I1 through I10. The fluid injectors 246 may be coupled to the turbine vanes 120 at axial positions as indicated by axial positions P0 through P10. The fluid flow rates through the fluid injectors 246 may be controlled by the controller 220, such as via the valves 256 of the fluid circuits 254, as indicated by fluid flow rates R0 through R10. The fluid flow rates may correspond to fuel flow rates if the fluid injectors 246 inject only fuel. For multi-fluid injectors 470, multiple fluid flow rates may be part of the control scheme to account for different fluid flow rates of fuel, oxidant, and barrier gas as discussed in detail above.

The control scheme of Table 1 is configured to use the axial positions (e.g., P0 through P10) and/or the fluid flow rates (e.g., R0 through R10) to cause variations in the axial combustion positions (e.g., variable heat release or combustion positions 320) along the turbine blades 118, as indicated by axial combustion positions CP0 through CP10. In certain embodiments, the varying axial positions of combustion (block 848) of the process 840 is achieved at least partially or entirely by positioning the fluid injectors I0 through I10 at a plurality of different axial positions corresponding to the axial positions P0 through P10. For example, the axial positions P0 through P10 may be indicated by a ratio of the axial distance 308 divided by the total axial length 310 as illustrated in FIGS. 2 and 3, wherein the ratio may gradually increase in increments from the axial position P0 to P10 (e.g., 0, 0.1, 0.2, 0.3, 0.4, 0.5, 0.6, 0.7, 0.8, 0.9, and 1.0).

In certain embodiments, the varying axial positions of combustion (block 848) of the process 840 is achieved at least partially or entirely by controlling fluid flow rates through the fluid injectors I0 through I10 at a plurality of different fluid flow rates (e.g., R0 through R10). For example, the fluid flow rates R0 through R10 may gradually increase in increments from P0 to P10, gradually decrease in increments from P0 to P10, or any combination of increases and decreases from P0 to P10. For example, the fluid flow rates R0 to R10 may gradually change by at least 5, 10, 15, or 20 percent. In the embodiment of FIG. 2, the control scheme may use the different axial positions P0 through P10 with or without the different fluid flow rates (e.g., R0 through R10). In the embodiment of FIG. 3, the control scheme may use the same axial positions P0 through P10 with the different fluid flow rates (e.g., R0 through R10).

Additionally, the control scheme of Table 1 is configured to use the axial positions (e.g., P0 through P10) and/or the fluid flow rates (e.g., R0 through R10) to control the axial range of the different axial combustion positions (e.g., variable heat release or combustion positions 320) along the turbine blades 118, as indicated by axial combustion positions CP0 through CP10. For example, in embodiments with different axial positions (e.g., P0 through P10), the process 840 may control the fluid flow rates to shut off the upstream and/or downstream fluid injectors 246 to reduce the axial range, such as by gradually shutting off the fluid flow in the following sequence: I10, I9, I8, I7, I6, I5, I4, I3, I2, I1, and I0. The process 840 may control the fluid flow rates to start fluid flows through the upstream and/or downstream fluid injectors 246 to increase the axial range, such as by gradually starting the fluid flow in the following sequence: I0, I1, I2, I3, I4, I5, I6, I7, I8, I9, and I10.

By further example, in embodiments with the same or different axial positions (e.g., P0 through P10), the process 840 may control the fluid flow rates to gradually increase the range of flow rates from R0 to R10, such as by gradually increasing the percentage changes in the flow rates from R0 to R10 to cause a greater axial range of the combustion positions. Additionally, the process 840 may control the fluid flow rates to gradually decrease the range of flow rates from R0 to R10, such as by gradually decreasing the percentage changes in the flow rates from R0 to R10 to cause a lesser axial range of the combustion positions. The foregoing aspects of the control scheme may be used independently or in any combination with one another for the process 840 of FIG. 33.

Figure 34:
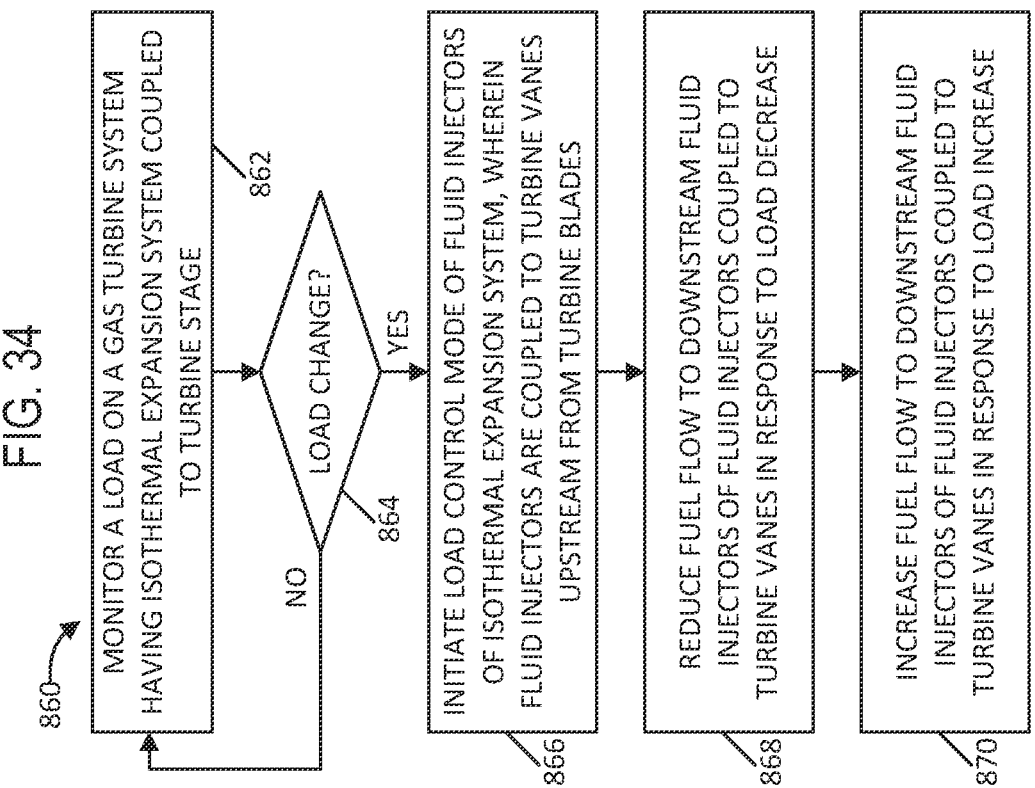
FIG. 34 is a flow chart of an embodiment of a process for operating the gas turbine system with the variable injection system of the isothermal expansion system 18 of FIGS. 1-33.

FIG. 34 is a flow chart of an embodiment of a process 860 for operating the gas turbine system 12 with the variable injection system 270 of the isothermal expansion system 18 of FIGS. 1-33, wherein the process 860 includes control via the controller 220. In certain embodiments, the process 860 provides detailed steps for the blocks 848 and 850 of the process 840 of FIG. 33. As illustrated, the process 860 includes monitoring a load on the gas turbine system 12 having the isothermal expansion system 18 coupled to the turbine stage 252 (block 862). The load may correspond to a driven machine, such as an electric generator. The process 860 also monitors for a load change (block 864), such as an increased load or a decreased load. The load change may impact a number of operating parameters of the gas turbine system 12, wherein the operating parameters may be monitored to enable monitoring of the load. For example, the operating parameters may include a compressor pressure ratio across the compressor section 42 of the gas turbine system 12, wherein a decrease in the compressor pressure ratio indicates a decrease in the load and an increase in the compressor pressure ratio indicates an increase in the load. The operating parameters also may include a compressor outlet pressure at an outlet of the compressor section 42, an exhaust temperature at an outlet of the turbine section 46, or any other suitable indicator of the load.

If the process 860 does not observe a load change (block 864), then the process 860 continues to monitor the load (block 862). If the process 860 does observe a load change (block 864), then the process 860 proceeds to initiate a load control mode (e.g., load control mode 364) of fluid injectors 246 of the isothermal expansion system 18, wherein the fluid injectors 246 are coupled to turbine vanes 120 upstream from turbine blades 118 (block 866). Using the load control mode, the process 860 proceeds to reduce a fuel flow to downstream fluid injectors of a plurality of fluid injectors 246 coupled to the turbine vanes 120 in response to a load decrease (block 868). For example, the reduced fuel flow may correspond to the fluid injectors 246 near the trailing edges 328 of the turbine blades 118. The process 860 may gradually reduce and/or stop the fuel flow to a sequence of the fluid injectors 246 at different axial positions along the turbine vane 120, wherein the sequence of reducing the fuel flow gradually moves from one fluid injector 246 to another in an upstream direction away from the trailing edges 328. Similarly, using the load control mode, the process 860 proceeds to increase a fuel flow to downstream fluid injectors of a plurality of fluid injectors 246 coupled to the turbine vanes 120 in response to a load increase (block 870). The process 860 may gradually start and/or increase the fuel flow to a sequence of the fluid injectors 246 at different axial positions along the turbine vane 120, wherein the sequence of increasing the fuel flow gradually moves from one fluid injector 246 to another in a downstream direction toward the trailing edges 328.

Technical effects of the invention include systems and methods for isothermal expansion in a turbine stage of a turbine section of a gas turbine system. The isothermal expansion may be achieved by active and/or passive control features to vary and distribute the axial positions of heat release of combustion occurring in the turbine stage. The isothermal expansion system may include a plurality of variations in fluid injectors of a variable injection system coupled to stationary vanes of the turbine stage. The fluid injectors may vary in positions (e.g., axial and radial positions), cross-sectional areas, geometries, angles of fluid injection, fluid flow rates, relative fluid flow rates through multiple passages of a multi-fluid injector, or any combination thereof. The isothermal expansion system also may include a plurality of variations in flame stabilizers of a variable stabilizer system coupled to rotary blades of the turbine stage. The flame stabilizers may vary in positions (e.g., axial and radial positions), cross-sectional areas, geometries, dimensions, or any combination thereof.

The isothermal expansion system also may provide active control, such as by controlling fluid flows through a plurality of different fluid circuits of the variable injection system, to adjust for different operating conditions of the gas turbine system (e.g., full load and part load conditions). For example, as discussed above, when transitioning from a full load condition to a part load condition of the gas turbine system, the isothermal expansion system may adjust the axial positions of the heat release of combustion to be further and further away from trailing edges of the rotary blades. The axial positions of heat release of combustion may be controlled by reducing and/or deactivating fluid injection from fluid injectors at downstream positions along the stationary vanes, reducing fluid flow rates through the fluid injectors to move the heat release positions further away from the trailing edges of the rotary blades, or a combination thereof.

The subject matter described in detail above may be defined by one or more clauses, as set forth below.

A system includes a gas turbine having a turbine shaft disposed along a rotational axis, a turbine casing disposed circumferentially about the turbine shaft, a combustion gas path disposed between the turbine shaft and the turbine casing, and a turbine stage disposed in the combustion gas path, wherein the turbine stage includes a plurality of turbine vanes disposed upstream from a plurality of turbine blades. The system includes an isothermal expansion system coupled to the turbine stage. The isothermal expansion system includes a plurality of multi-fluid injectors configured to vary axial positions of combustion within a turbine stage expansion of the turbine stage to reduce temperature variations over the turbine stage expansion, wherein at least one multi-fluid injector of the plurality of multi-fluid injectors is coupled to each of the plurality of turbine vanes. Each of the plurality of multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

The system of any preceding clause, wherein the at least one multi-fluid injector includes a concentric arrangement of the fuel port, the barrier fluid port, and the oxidant port.

The system of any preceding clause, wherein the barrier fluid port is disposed about the fuel port, and the oxidant port is disposed about the barrier fluid port.

The system of any preceding clause, wherein the barrier fluid port is disposed about the oxidant port, and the fuel port is disposed about the barrier fluid port.

The system of any preceding clause, wherein the barrier fluid includes a reduced oxygen gas, a substantially oxygen free gas, an inert gas, an exhaust gas, carbon dioxide, or a combination thereof.

The system of any preceding clause, wherein the at least one multi-fluid injector varies in a geometry from one vane to another in the plurality of turbine vanes to vary the axial positions of combustion within the turbine stage expansion.

The system of any preceding clause, wherein the at least one multi-fluid injector varies in the geometry by a total of cross-sectional areas of the fuel port, the barrier fluid port, and the oxidant port.

The system of any preceding clause, wherein the at least one multi-fluid injector varies in the geometry by a ratio of cross-sectional areas of the fuel port, the barrier fluid port, and the oxidant port.

The system of any preceding clause, wherein the at least one multi-fluid injector varies in a fluid flow from one vane to another in the plurality of turbine vanes to vary the axial positions of combustion within the turbine stage expansion.

The system of any preceding clause, wherein the at least one multi-fluid injector varies in the fluid flow by a total of a fuel flow of the fuel from the fuel port, a barrier fluid flow of the barrier fluid from the barrier fluid port, and an oxidant flow of the oxidant from the oxidant port.

The system of any preceding clause, wherein the at least one multi-fluid injector varies in the fluid flow by a ratio of a fuel flow of the fuel from the fuel port, a barrier fluid flow of the barrier fluid from the barrier fluid port, and an oxidant flow of the oxidant from the oxidant port.

The system of any preceding clause, wherein the turbine stage is a first turbine stage in the gas turbine.

The system of any preceding clause, wherein the plurality of turbine blades includes a first plurality of turbine blades disposed in a first annular arrangement and a second plurality of turbine blades disposed in a second annular arrangement, wherein the first plurality of turbine blades is configured to rotate in a first rotational direction about the rotational axis via a first shaft portion of the turbine shaft, wherein the second plurality of turbine blades is configured to rotate in a second rotational direction about the rotational axis via a second shaft portion of the turbine shaft, wherein the first and second rotational directions are opposite to one another.

The system of any preceding clause, including a combustor disposed upstream from the gas turbine, wherein the combustor is configured to combust a fuel with air in a stoichiometric ratio, and an exhaust gas from the gas turbine is at least partially routed to the barrier fluid port of the at least one multi-fluid injector of the plurality of multi-fluid injectors.

The system of any preceding clause, including a compressor upstream of the combustor, wherein the exhaust gas is at least partially routed to the compressor.

A method includes routing a combustion gas through a turbine stage along a combustion gas path disposed between a turbine shaft and a turbine casing of a gas turbine, wherein the turbine shaft is disposed along a rotational axis, the turbine casing is disposed circumferentially about the turbine shaft, and the turbine stage includes a plurality of turbine vanes disposed upstream from a plurality of turbine blades. The method includes varying axial positions of combustion within a turbine stage expansion of the turbine stage to reduce temperature variations over the turbine stage expansion via a plurality of multi-fluid injectors of an isothermal expansion system coupled to the turbine stage. At least one multi-fluid injector of the plurality of multi-fluid injectors is coupled to each of the plurality of turbine vanes. Each of the plurality of multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

The method of the preceding clause, wherein the at least one multi-fluid injector includes a concentric arrangement of the fuel port, the barrier fluid port, and the oxidant port.

The method of any preceding clause, wherein the at least one multi-fluid injector varies in a geometry, a fluid flow, or a combination thereof, from one vane to another in the plurality of turbine vanes to vary the axial positions of combustion within the turbine stage expansion.

A system includes a controller having a processor, a memory, and instructions stored on the memory and executable by the processor to control combustion in a combustor to generate a combustion gas flow that flows through a turbine stage along a combustion gas path disposed between a turbine shaft and a turbine casing of a gas turbine, wherein the turbine shaft is disposed along a rotational axis, the turbine casing is disposed circumferentially about the turbine shaft, and the turbine stage includes a plurality of turbine vanes disposed upstream from a plurality of turbine blades. The controller is configured to control an isothermal expansion system including a plurality of multi-fluid injectors to vary axial positions of combustion within a turbine stage expansion of the turbine stage to reduce temperature variations over the turbine stage expansion, wherein at least one multi-fluid injector of the plurality of multi-fluid injectors is coupled to each of the plurality of turbine vanes. Each of the plurality of multi-fluid injectors includes a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

The system of the preceding clause, wherein the controller is configured to vary a fuel flow of the fuel, an oxidant flow of the oxidant, a barrier fluid flow of the barrier fluid, or a combination thereof, through the at least one multi-fluid injector from one vane to another in the plurality of turbine vanes to vary the axial positions of combustion within the turbine stage expansion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a turbine vane of a turbine stage configured to mount along a combustion gas path of a gas turbine; and
   a multi-fluid injector coupled to the turbine vane, wherein the multi-fluid injector comprises a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

2. The system of claim 1, wherein the multi-fluid injector comprises a concentric arrangement of the fuel port, the barrier fluid port, and the oxidant port.

3. The system of claim 2, wherein the barrier fluid port is disposed about the fuel port, and the oxidant port is disposed about the barrier fluid port.

4. The system of claim 2, wherein the barrier fluid port is disposed about the oxidant port, and the fuel port is disposed about the barrier fluid port.

5. The system of claim 1, wherein the barrier fluid comprises a reduced oxygen gas, a substantially oxygen free gas, an inert gas, an exhaust gas, carbon dioxide, or a combination thereof.

6. The system of claim 1, wherein the turbine vane is one of a plurality of turbine vanes in the turbine stage, each turbine vane of the turbine stage comprising a plurality of multi-fluid injectors each having the fuel port, the oxidant port, and the barrier fluid port; and wherein the plurality of multi-fluid injectors varies in a geometry from one turbine vane to another in the plurality of turbine vanes in the turbine stage.

7. The system of claim 6, wherein the geometry varies by a total of cross-sectional areas of the fuel port, the barrier fluid port, and the oxidant port.

8. The system of claim 6, wherein the geometry varies by a ratio of cross-sectional areas of the fuel port, the barrier fluid port, and the oxidant port.

9. The system of claim 1, wherein the turbine vane is one of a plurality of turbine vanes in the turbine stage, each turbine vane of the turbine stage comprising a plurality of multi-fluid injectors each having the fuel port, the oxidant port, and the barrier fluid port; and wherein the plurality of multi-fluid injectors varies in a fluid flow from one vane to another in the plurality of turbine vanes in the turbine stage.

10. The system of claim 9, wherein the fluid flow varies by a total of a fuel flow of the fuel from the fuel port, a barrier fluid flow of the barrier fluid from the barrier fluid port, and an oxidant flow of the oxidant from the oxidant port.

11. The system of claim 9, wherein the fluid flow varies by a ratio of a fuel flow of the fuel from the fuel port, a barrier fluid flow of the barrier fluid from the barrier fluid port, and an oxidant flow of the oxidant from the oxidant port.

12. The system of claim 1, wherein the turbine stage is a first turbine stage in the gas turbine.

13. The system of claim 1, comprising an isothermal expansion system coupled to the turbine stage, wherein the isothermal expansion system comprises a plurality of multi-fluid injectors configured to vary axial positions of combustion within a turbine stage expansion of the turbine stage to reduce temperature variations over the turbine stage expansion.

14. A system, comprising:
   a plurality of turbine vanes of a turbine stage configured to mount along a combustion gas path of a gas turbine; and
   a plurality of multi-fluid injectors, wherein at least one multi-fluid injector of the plurality of multi-fluid injectors is coupled to each of the plurality of turbine vanes, wherein each of the plurality of multi-fluid injectors comprises a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

15. The system of claim 14, wherein the turbine stage is a first turbine stage in the gas turbine.

16. The system of claim 14, wherein the plurality of multi-fluid injectors varies in a geometry and/or a fluid flow from one injector to another in the plurality of multi-fluid injectors.

17. A system, comprising:
   a turbine stage along a combustion gas path of a gas turbine, wherein the turbine stage comprises a plurality of turbine vanes; and
   a plurality of multi-fluid injectors coupled to the turbine stage, wherein each of the plurality of multi-fluid injectors comprises a fuel port configured to inject a fuel, an oxidant port configured to inject an oxidant, and a barrier fluid port configured to inject a barrier fluid between the fuel and the oxidant, wherein the barrier fluid is configured to delay mixing between the fuel and the oxidant.

18. The system of claim 17, wherein the plurality of multi-fluid injectors is coupled to the turbine stage over an axial distance from a leading edge to a trailing edge of the plurality of multi-fluid injectors.

19. The system of claim 18, wherein the plurality of multi-fluid injectors varies in a geometry and/or a fluid flow from one injector to another in the plurality of multi-fluid injectors.

20. The system of claim 18, wherein the plurality of multi-fluid injectors varies in an axial position relative to the leading edge from one injector to another in the plurality of multi-fluid injectors.

* * * * *